May 11, 1926.
F. G. L. BOYER ET AL
1,584,508
SCALE
Filed Feb. 4, 1922
27 Sheets-Sheet 1
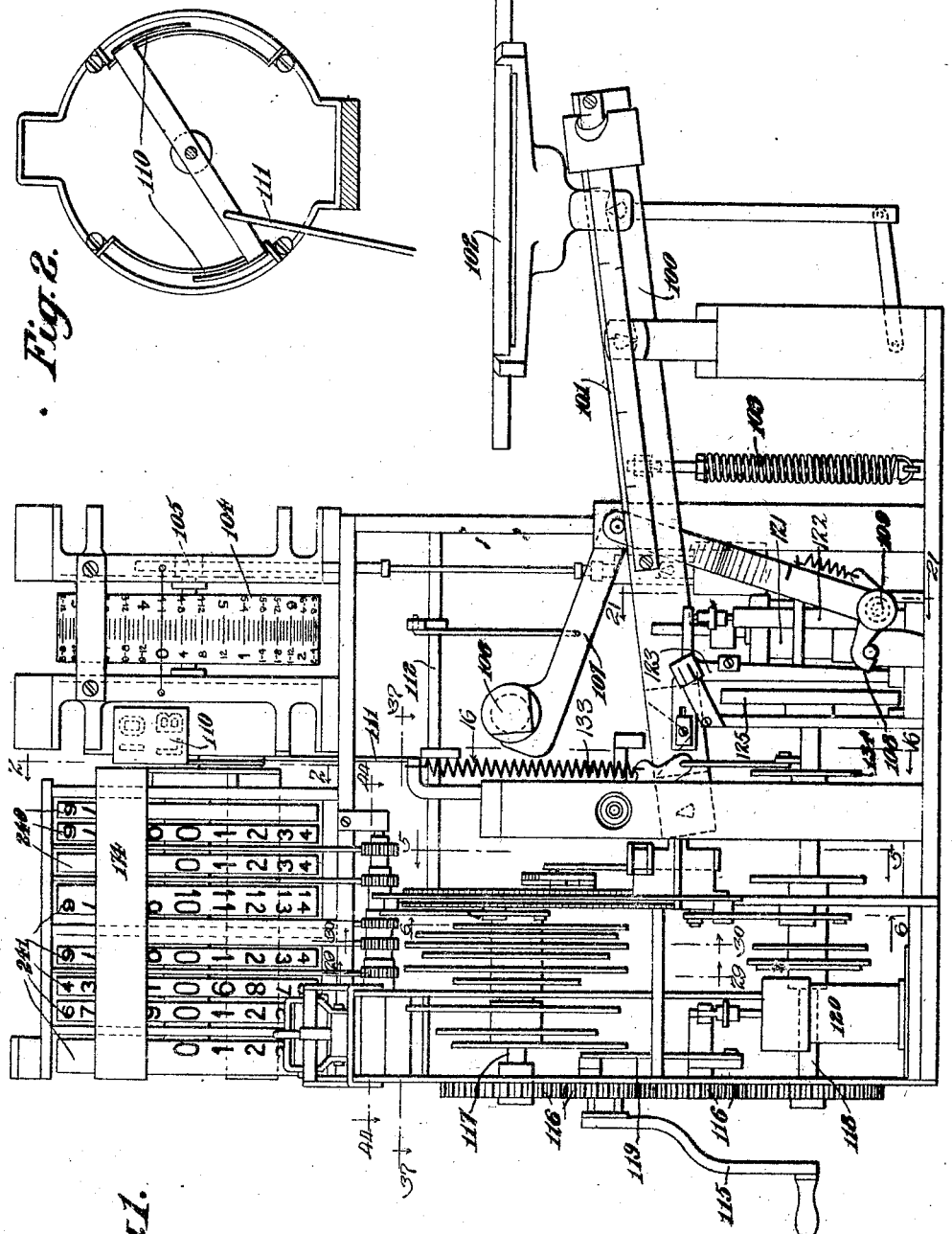
INVENTORS
Frederick G. L. Boyer and Edith E. L. Boyer
By Cooper, Kerr & Dunham
their ATTORNEYS

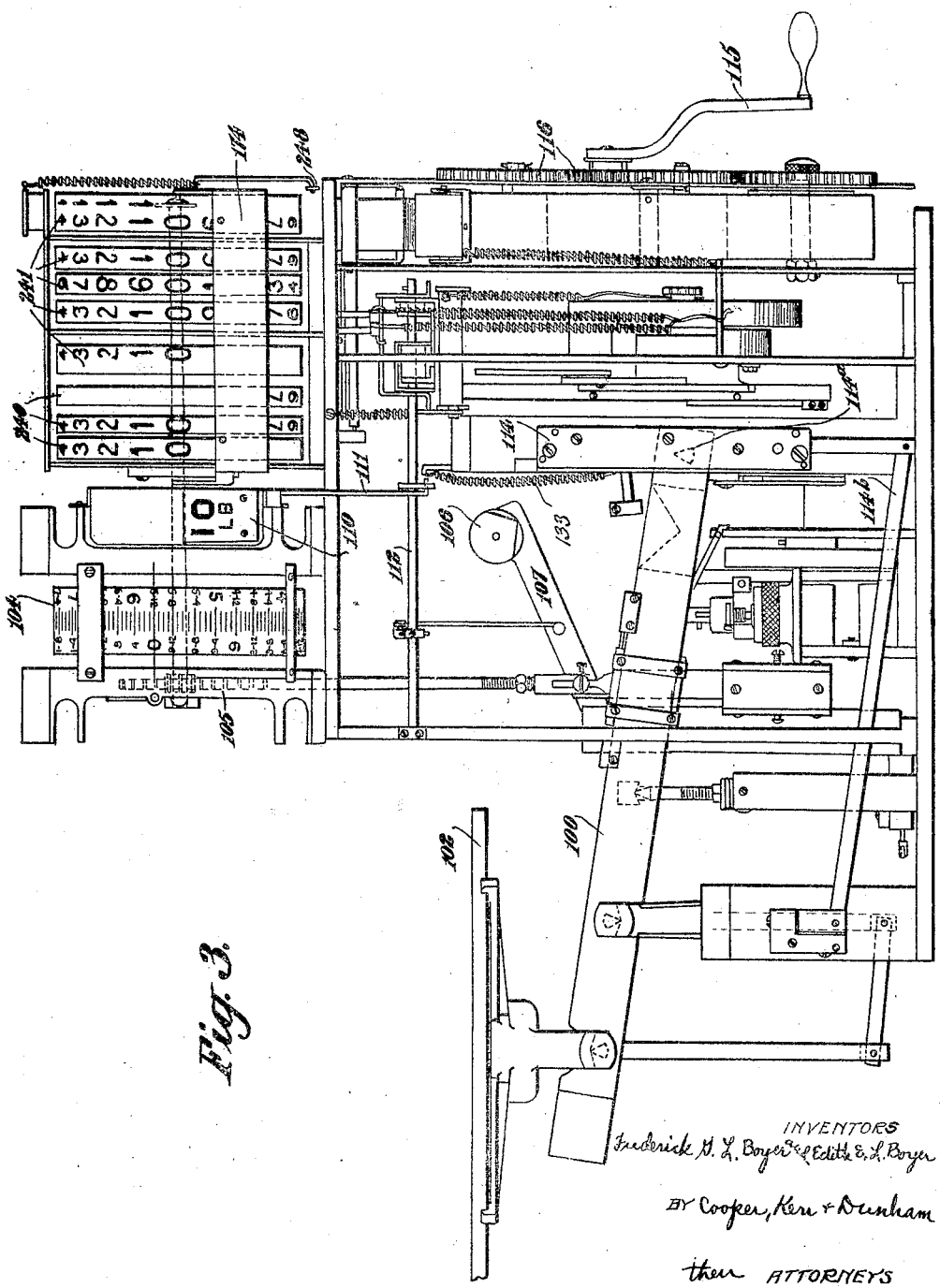

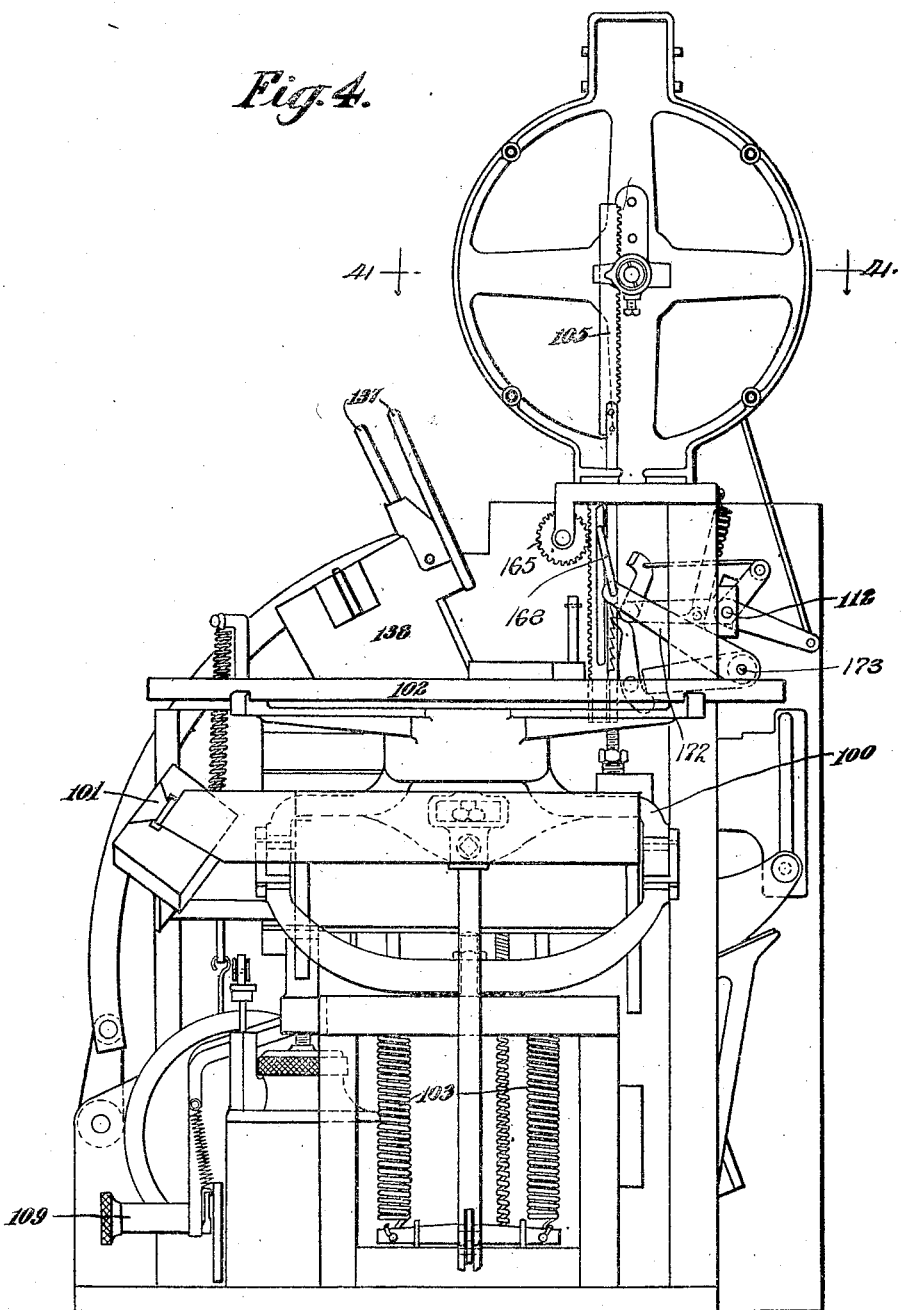

May 11, 1926.　　　　　　　　　　　　　　　1,584,508
F. G. L. BOYER ET AL
SCALE
Filed Feb. 4, 1922　　　27 Sheets-Sheet 4
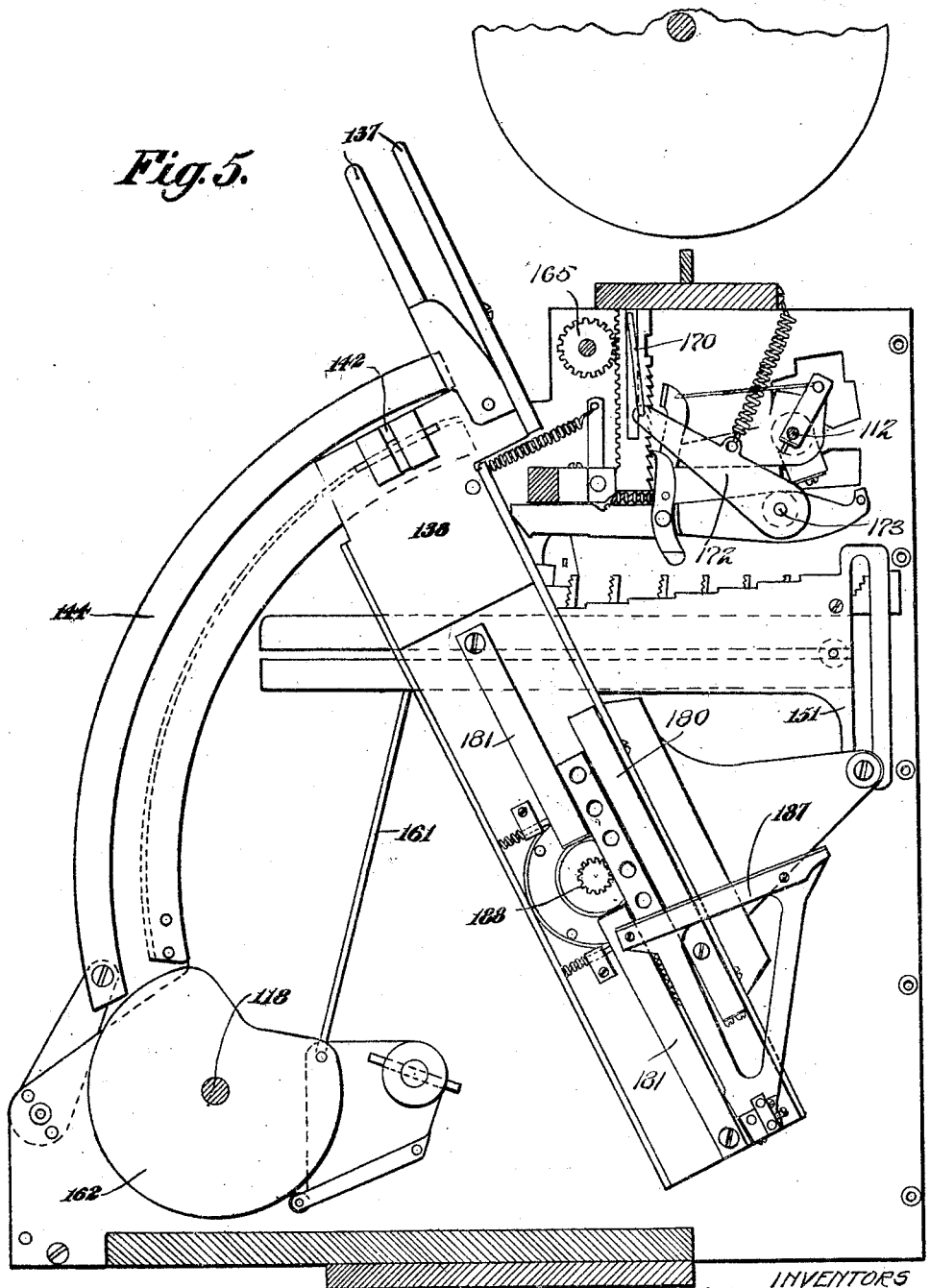

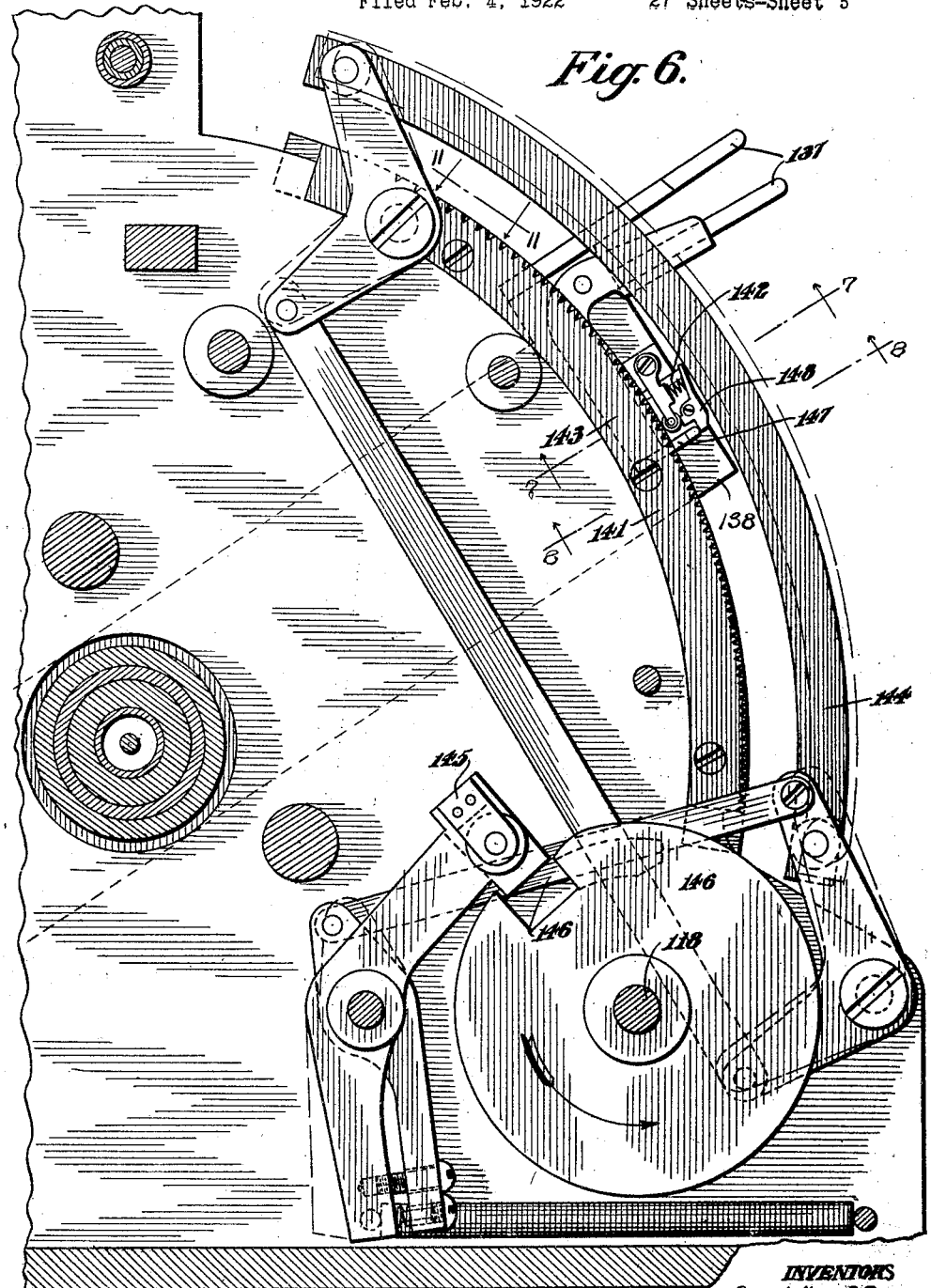

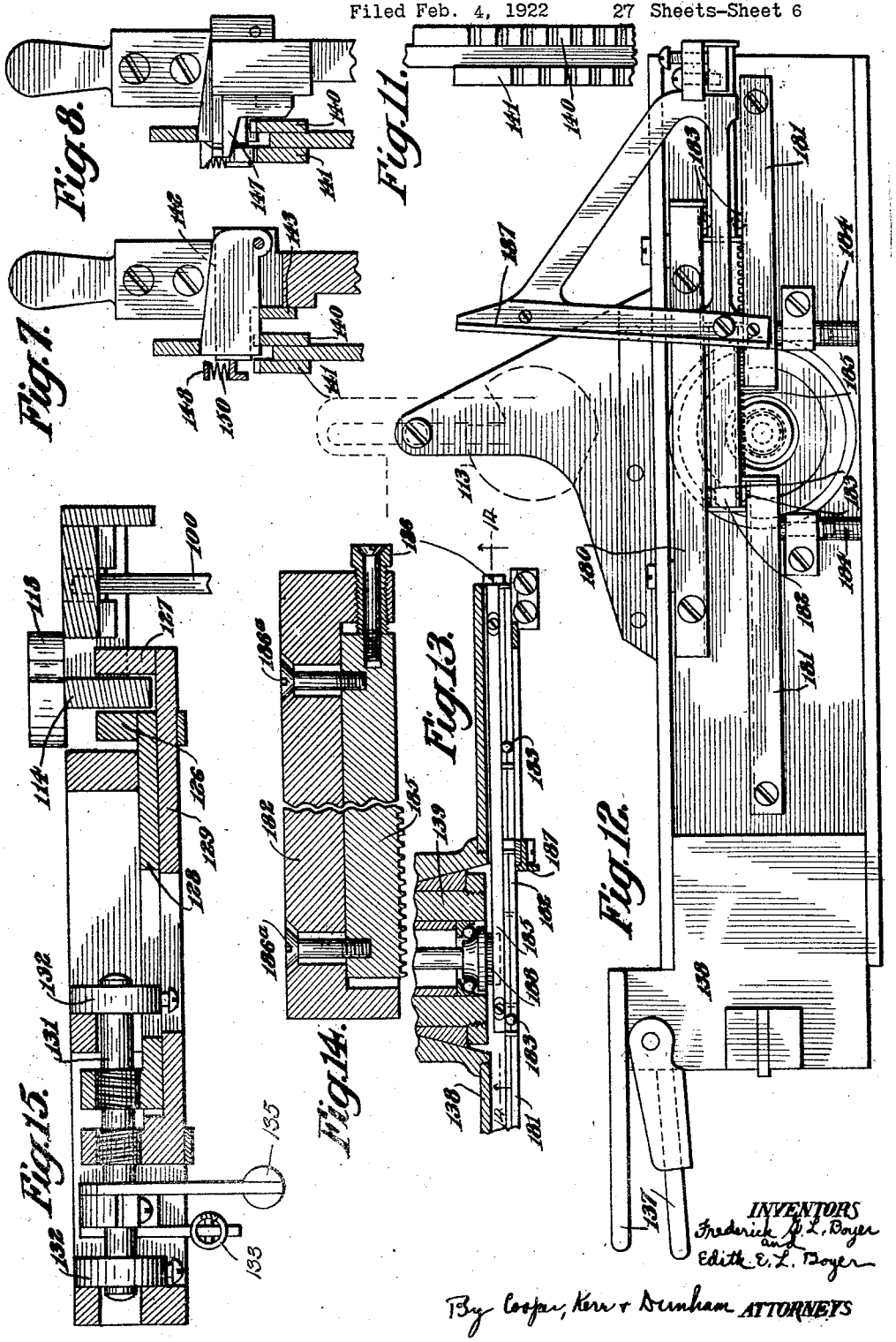

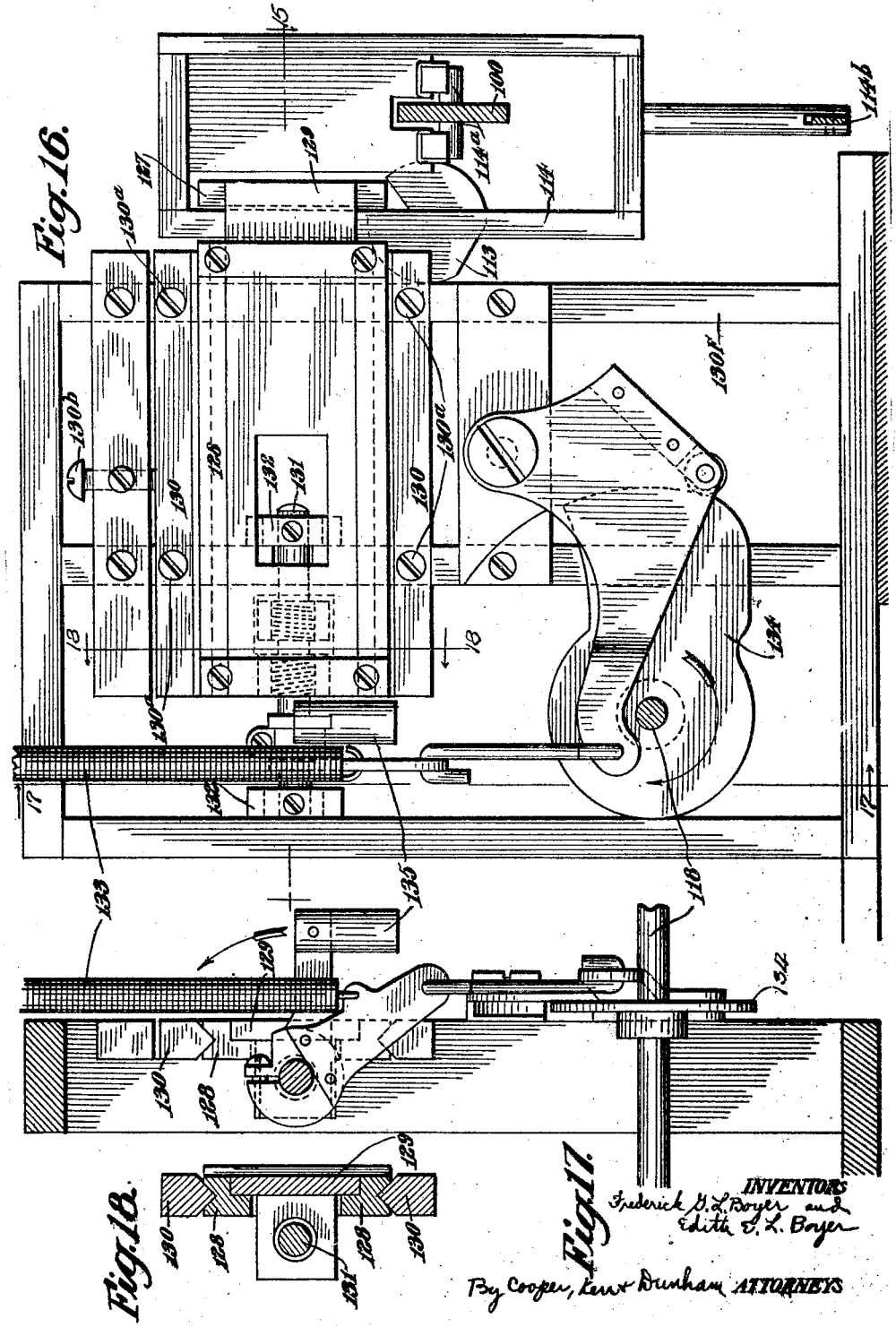

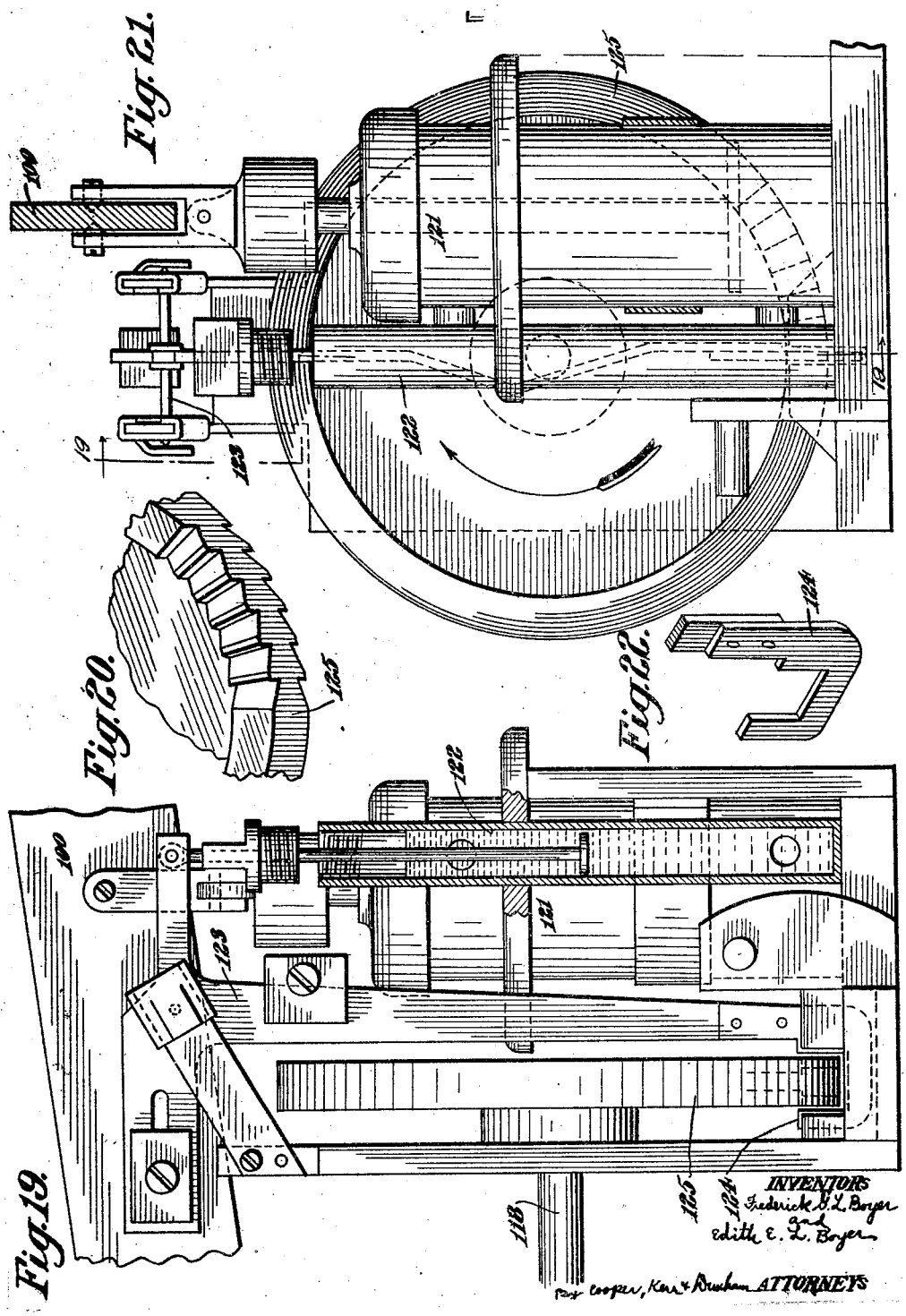

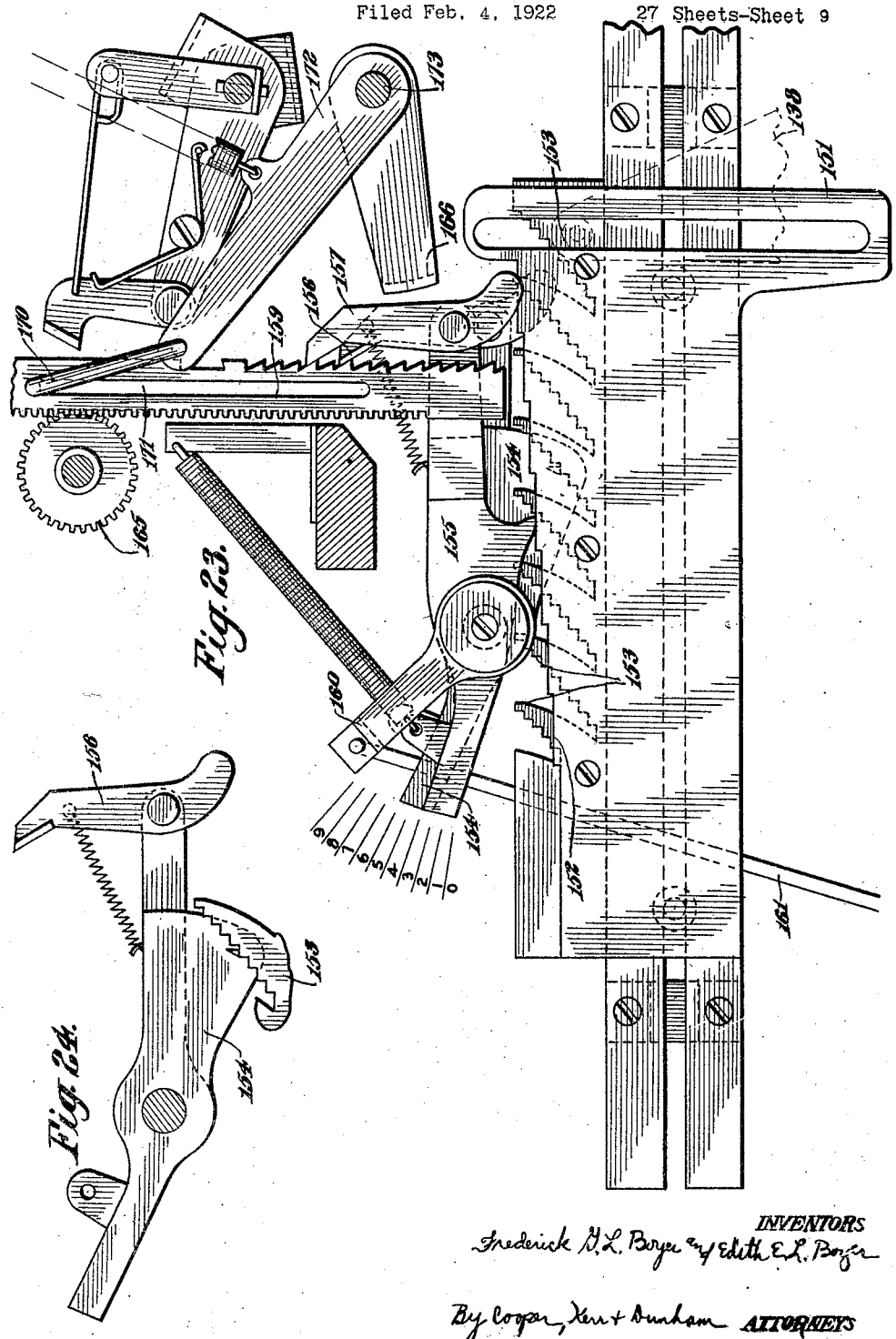

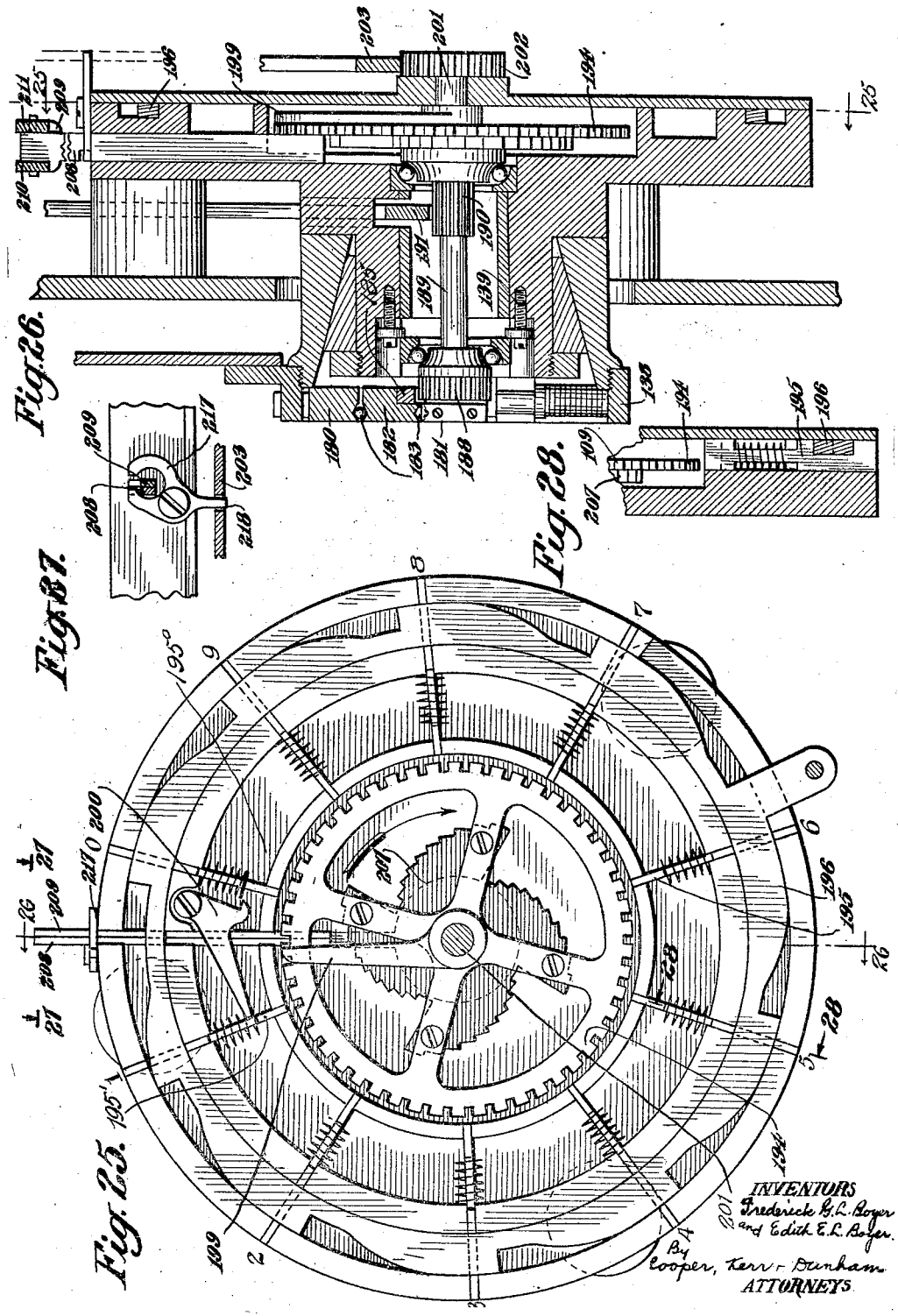

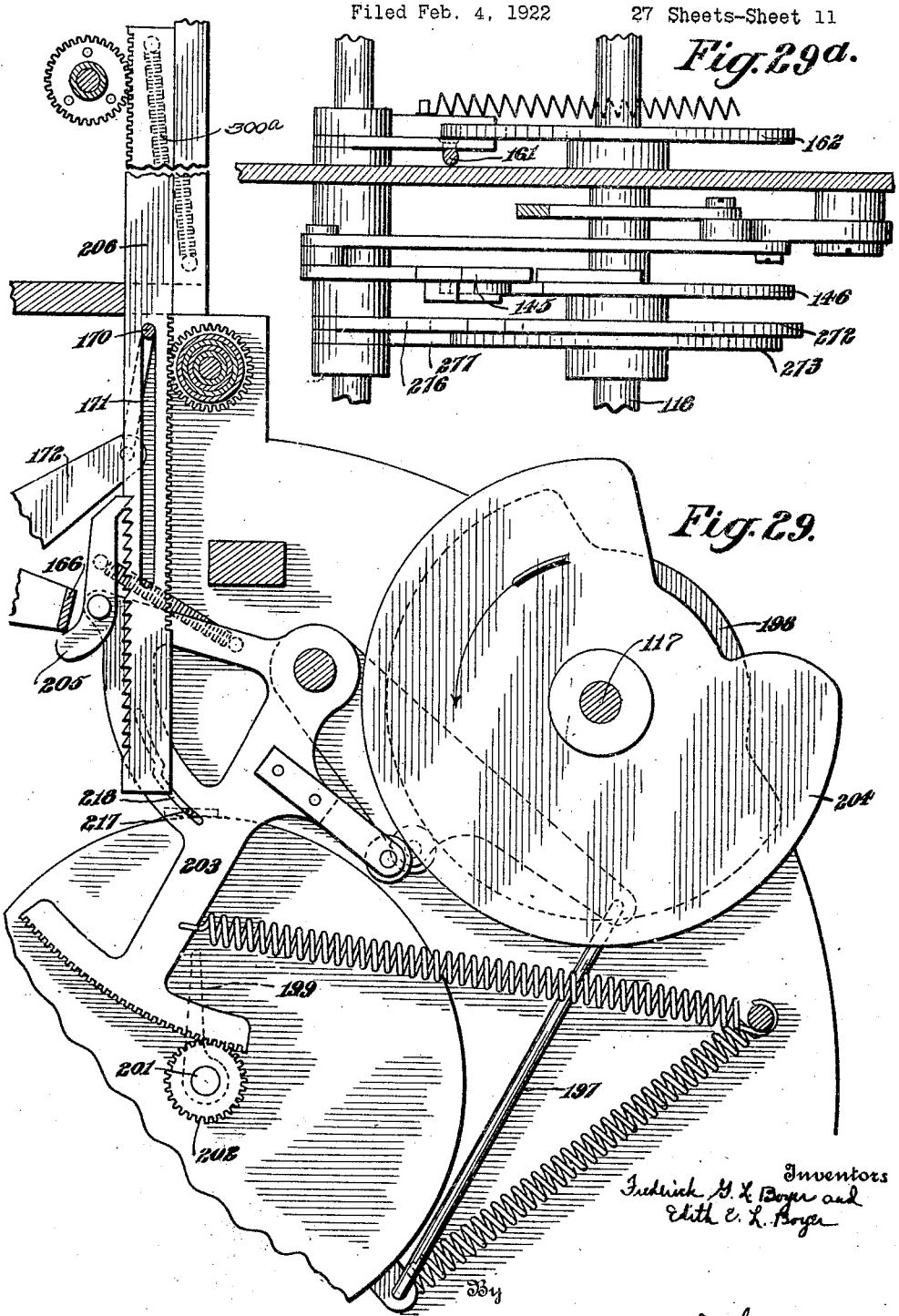

May 11, 1926.
F. G. L. BOYER ET AL
SCALE
Filed Feb. 4, 1922. 27 Sheets-Sheet 12
1,584,508
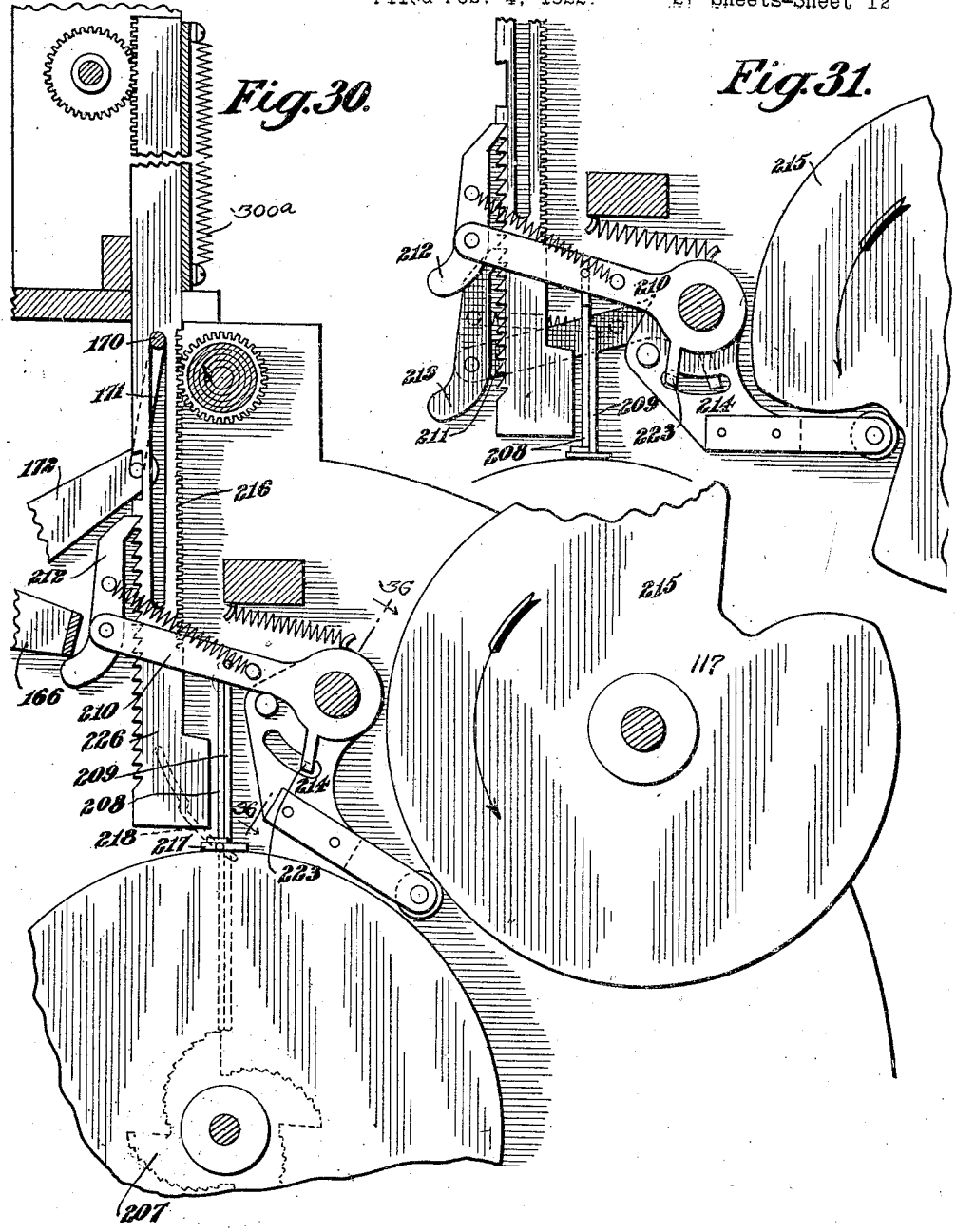

May 11, 1926.
F. G. L. BOYER ET AL
SCALE
Filed Feb. 4, 1922    27 Sheets-Sheet 13
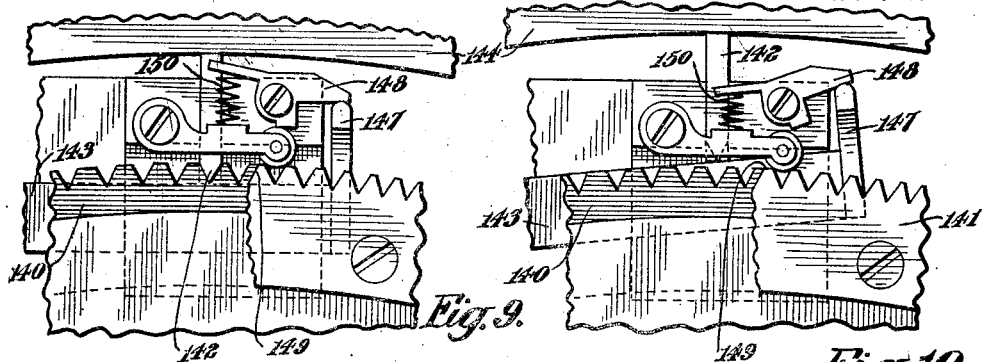
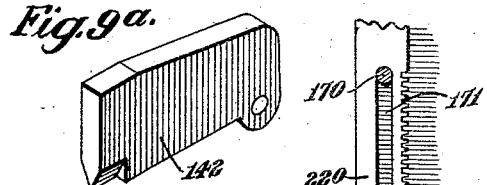
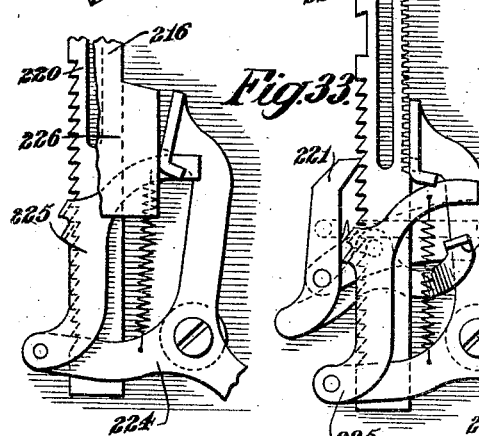
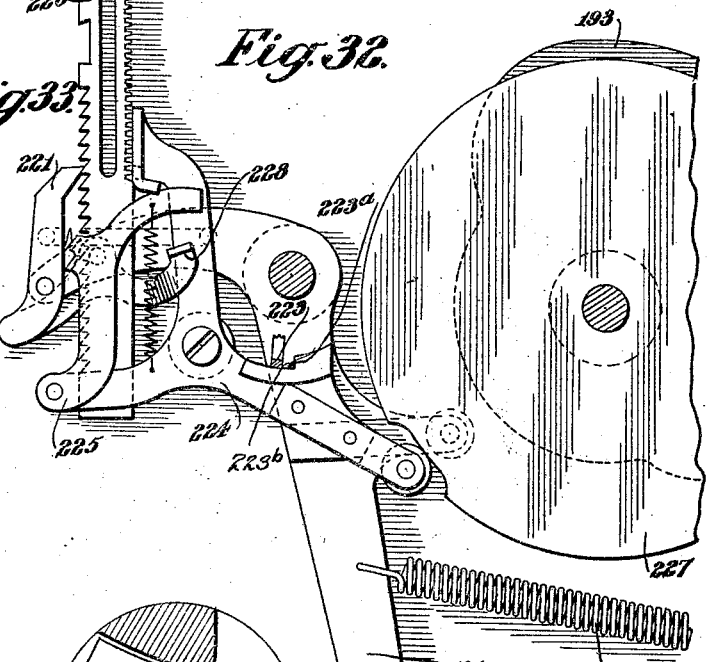
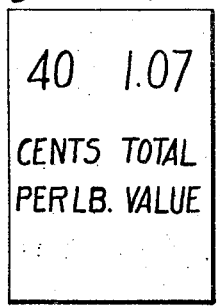
INVENTORS
Frederick G. L. Boyer & Edith E. L. Boyer
By Cooper, Kerr & Dunham their ATTORNEYS

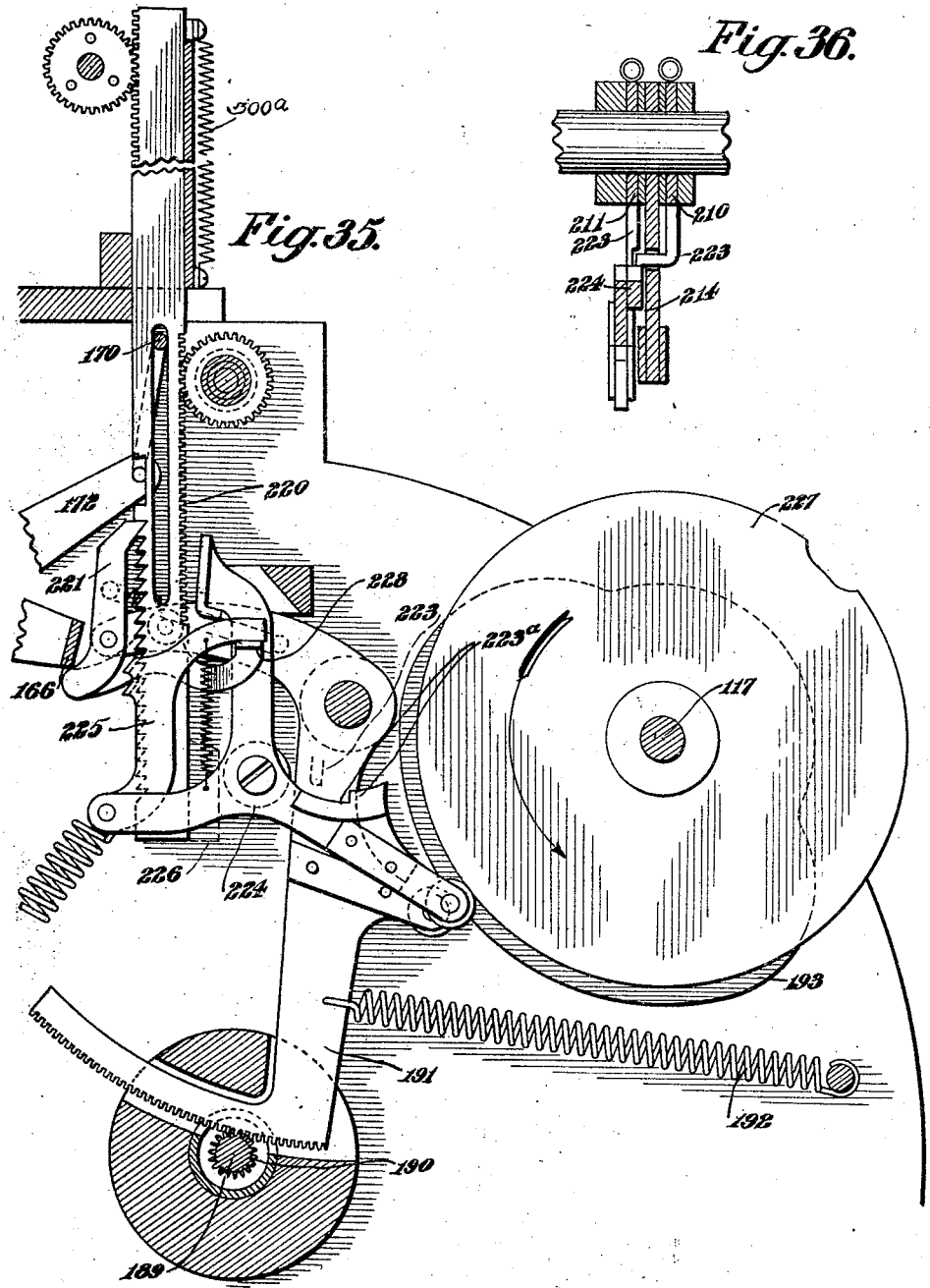

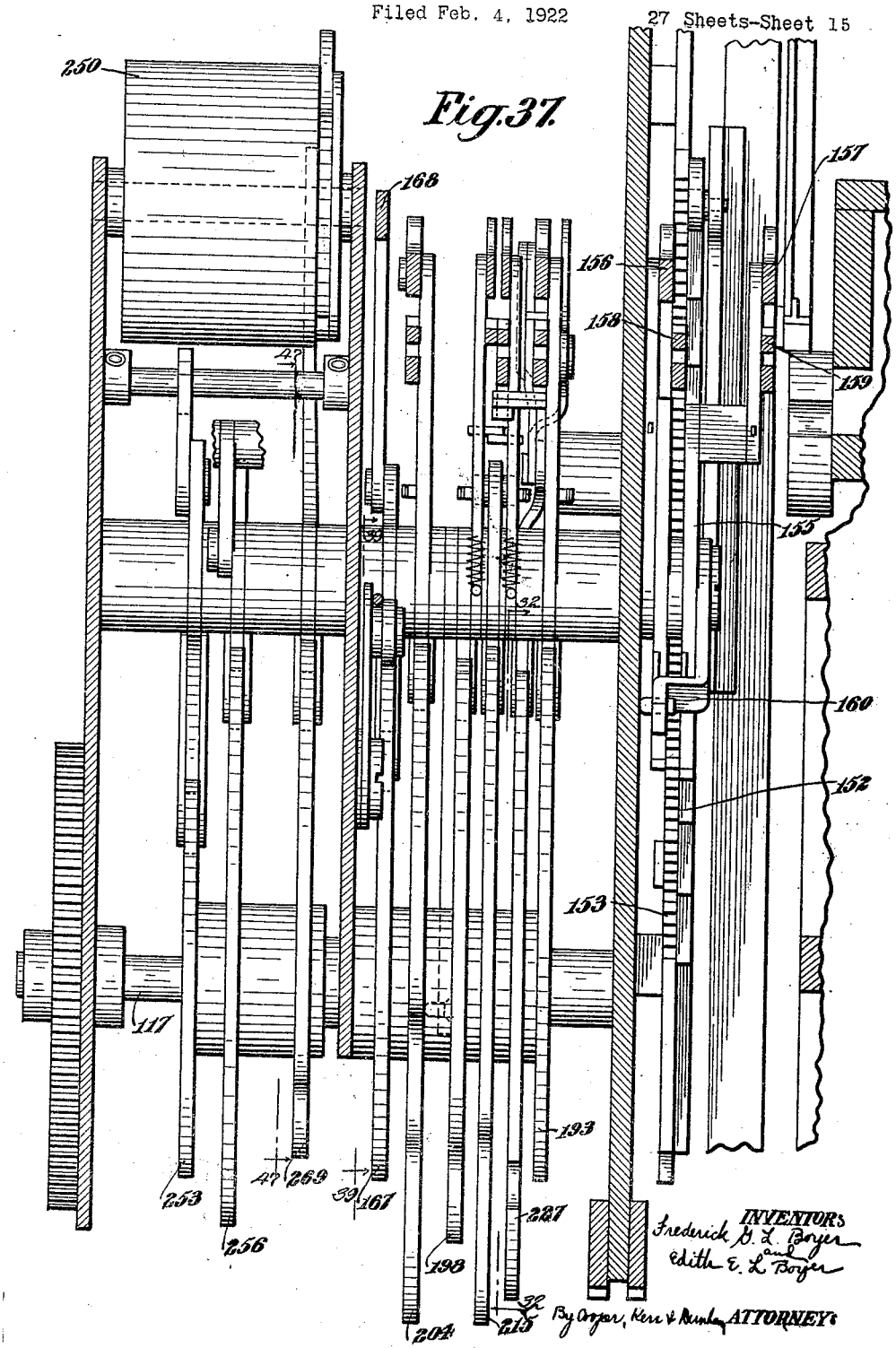

May 11, 1926.
F. G. L. BOYER ET AL
SCALE
Filed Feb. 4, 1922
1,584,508
27 Sheets-Sheet 16
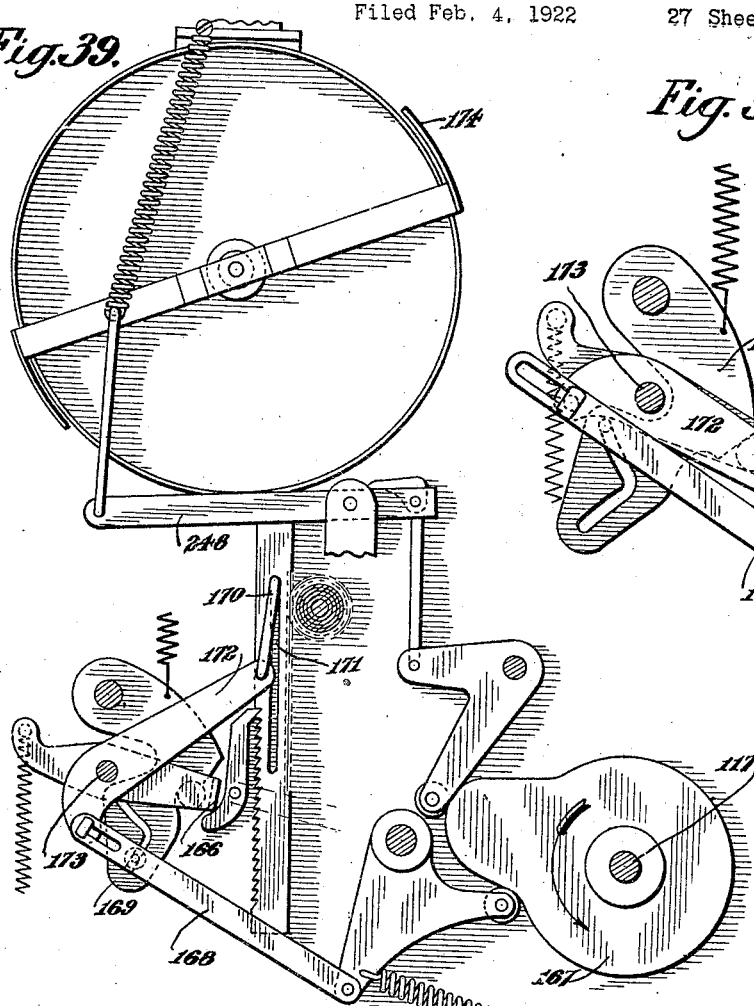
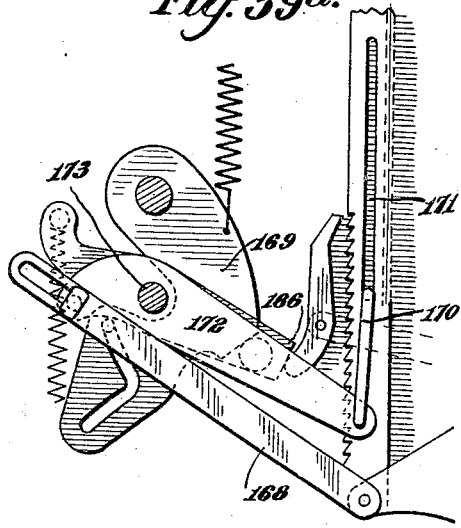
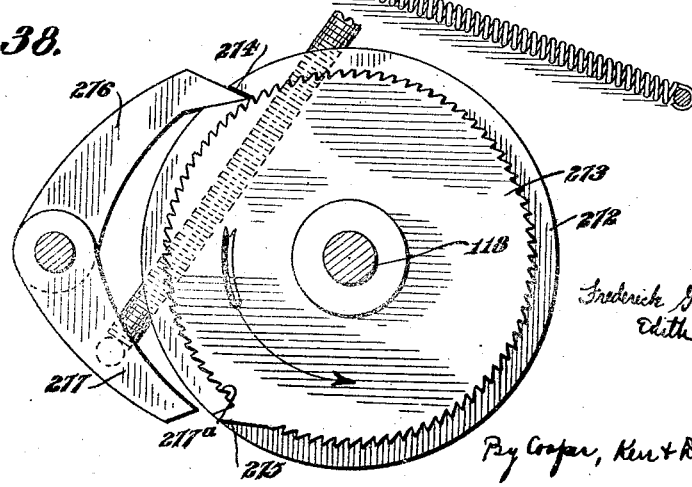

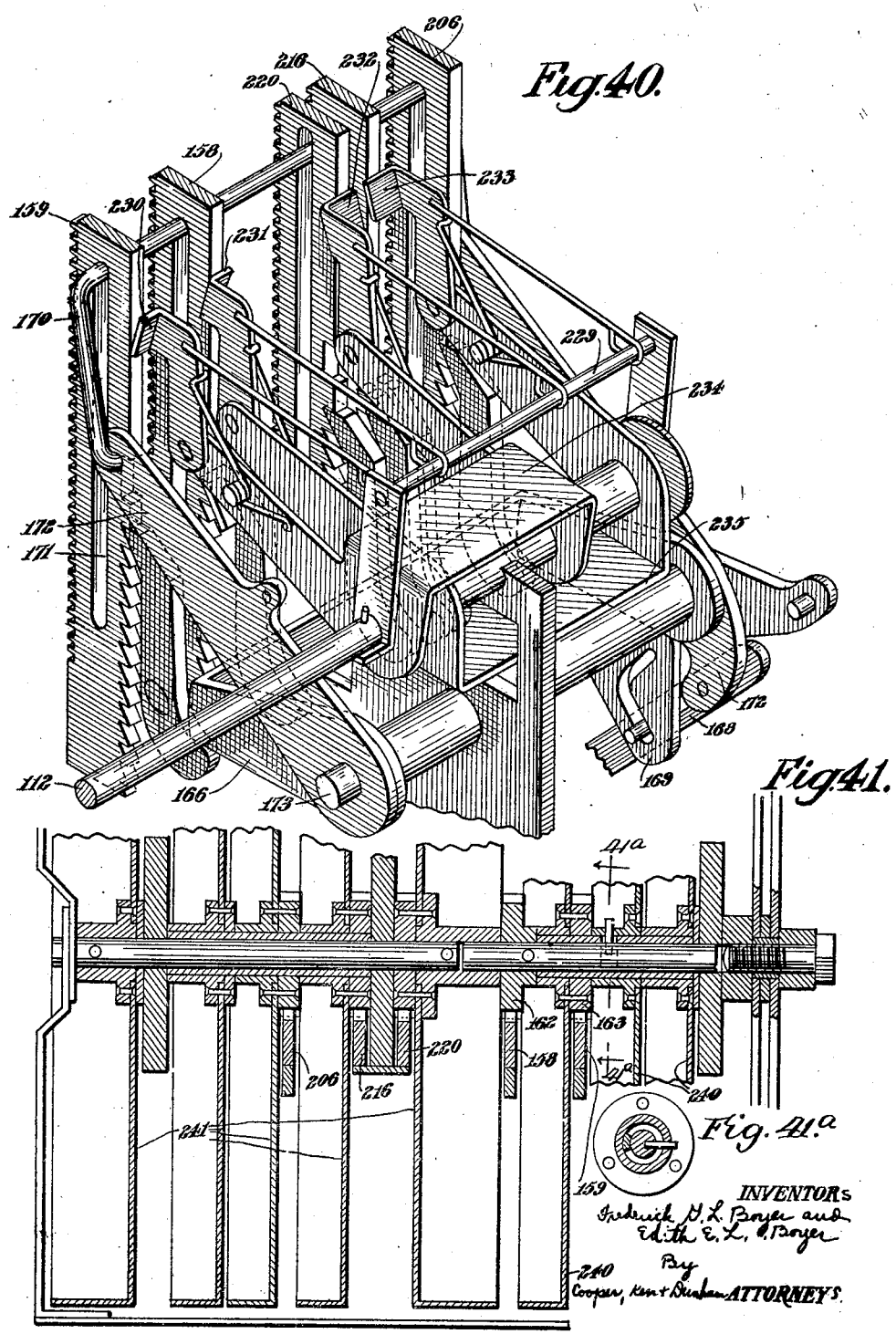

May 11, 1926.

F. G. L. BOYER ET AL 1,584,508

SCALE

Filed Feb. 4, 1922    27 Sheets-Sheet 18

INVENTORS
Frederick G. L. Boyer and
Edith E. D. Boyer
BY Cooper, Kerr + Dunham
their ATTORNEYS.

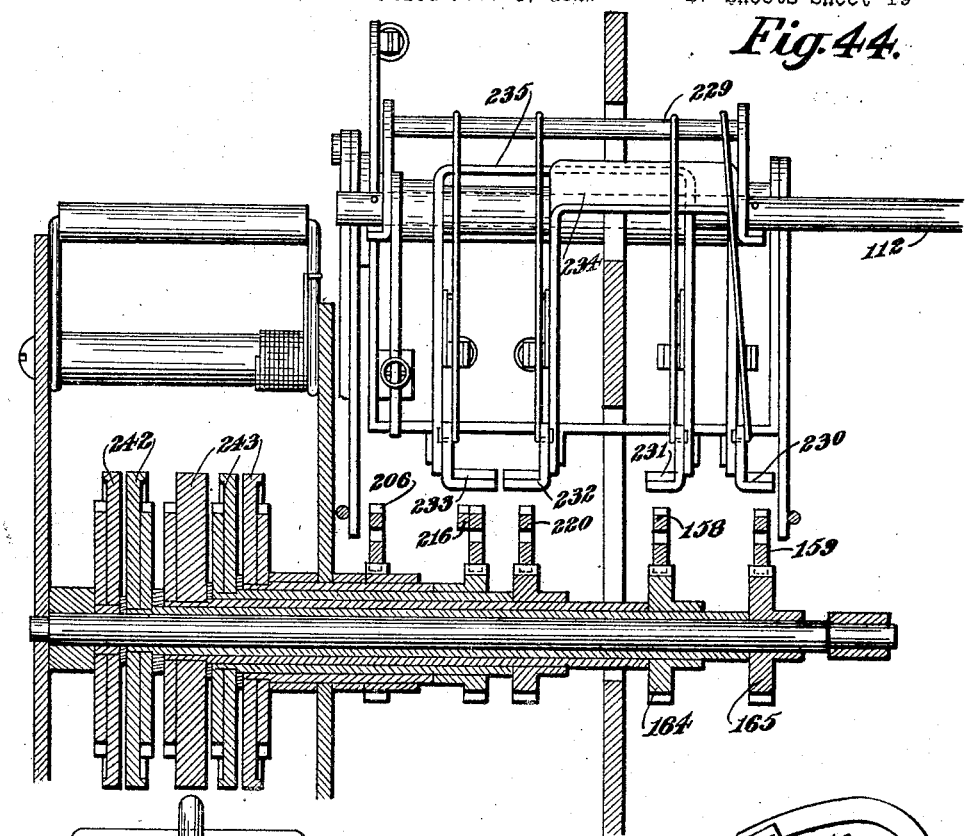
Fig.44.
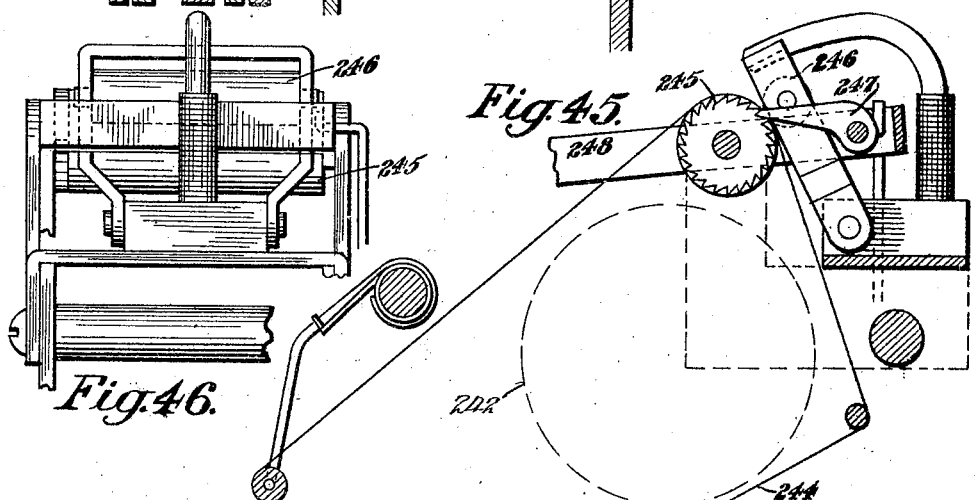
Fig.45.
Fig.46.

May 11, 1926.

F. G. L. BOYER ET AL

SCALE

Filed Feb. 4, 1922      27 Sheets-Sheet 22

1,584,508

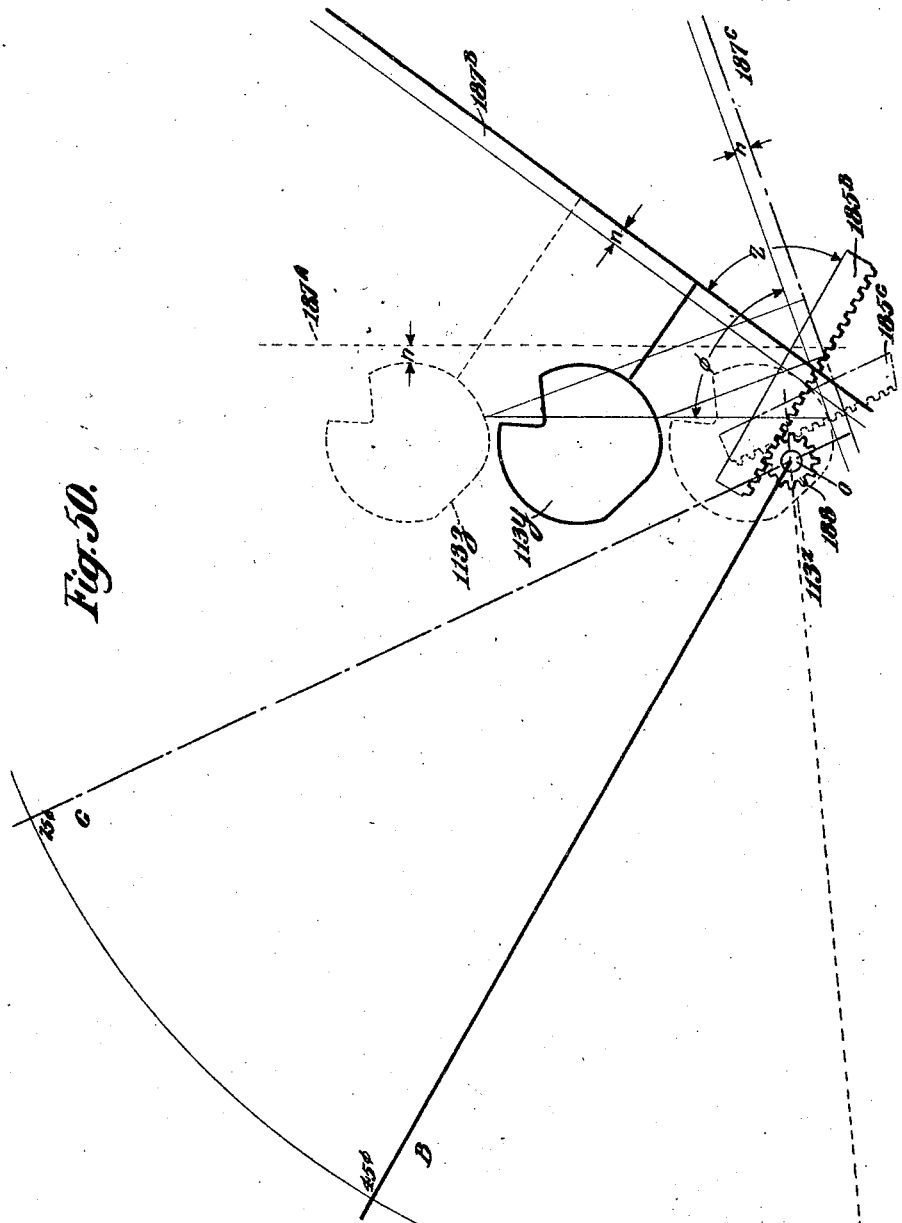

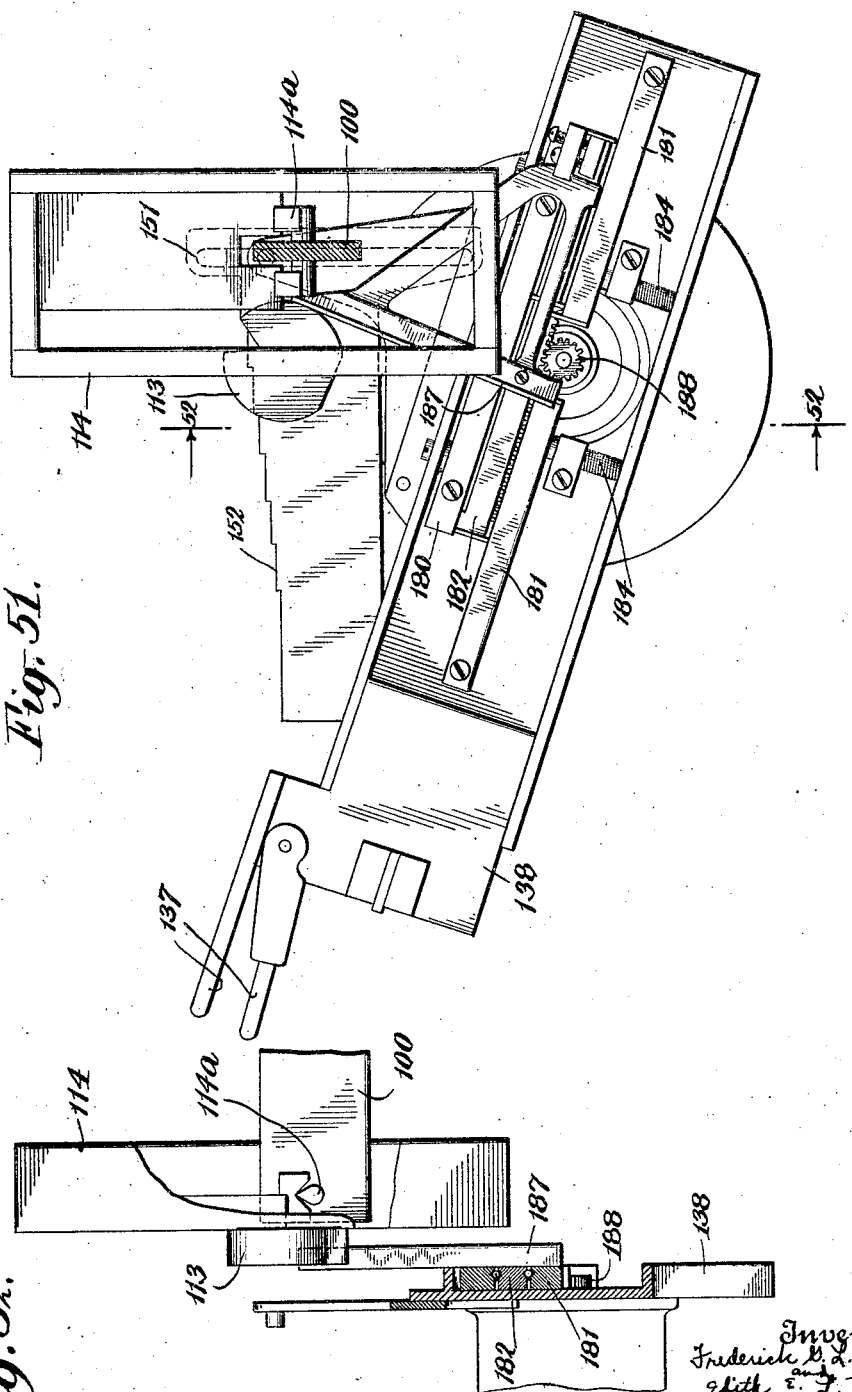

May 11, 1926.
F. G. L. BOYER ET AL
1,584,508
SCALE
Filed Feb. 4, 1922 27 Sheets-Sheet 25
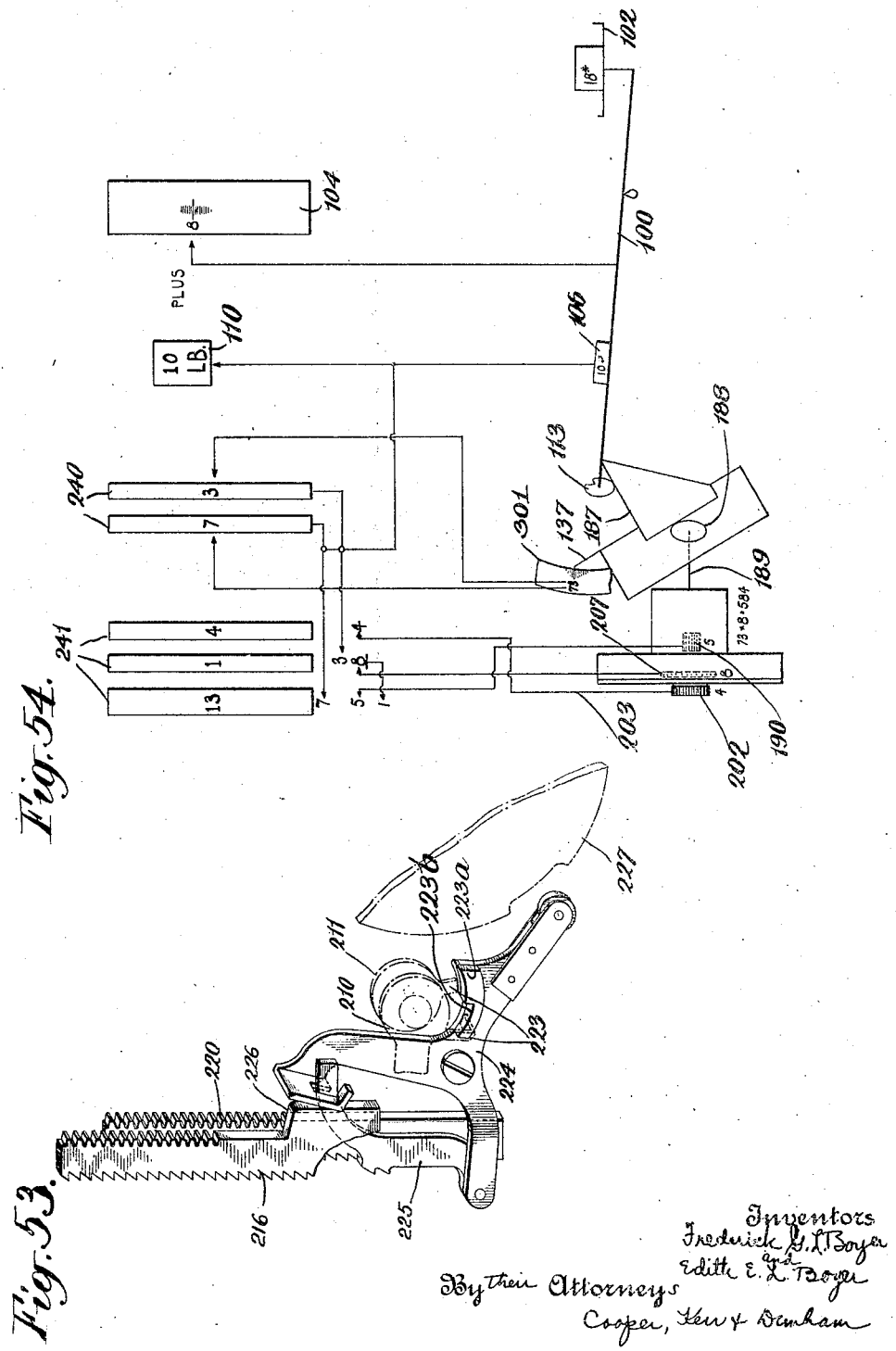

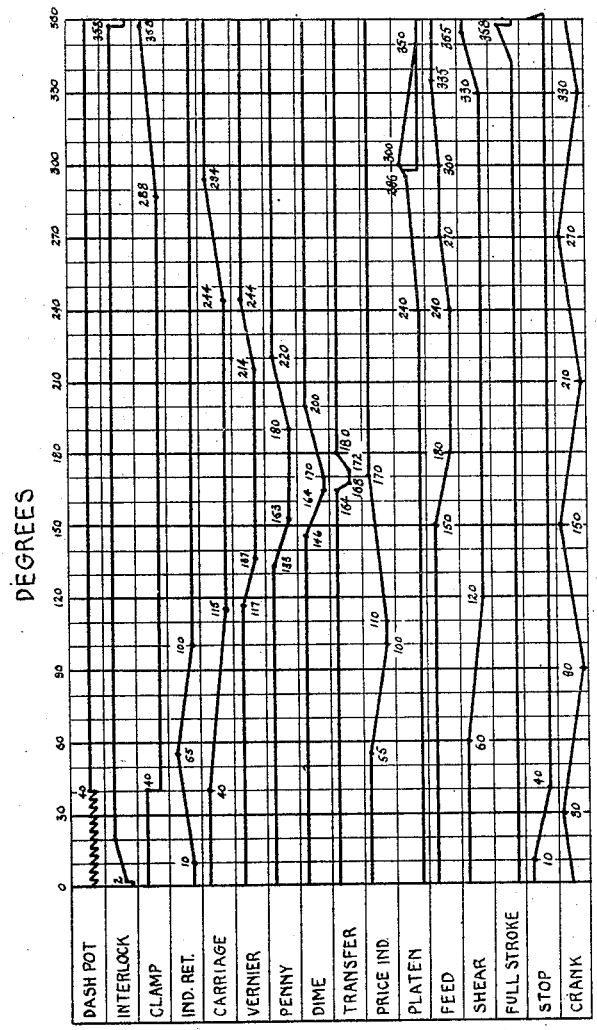

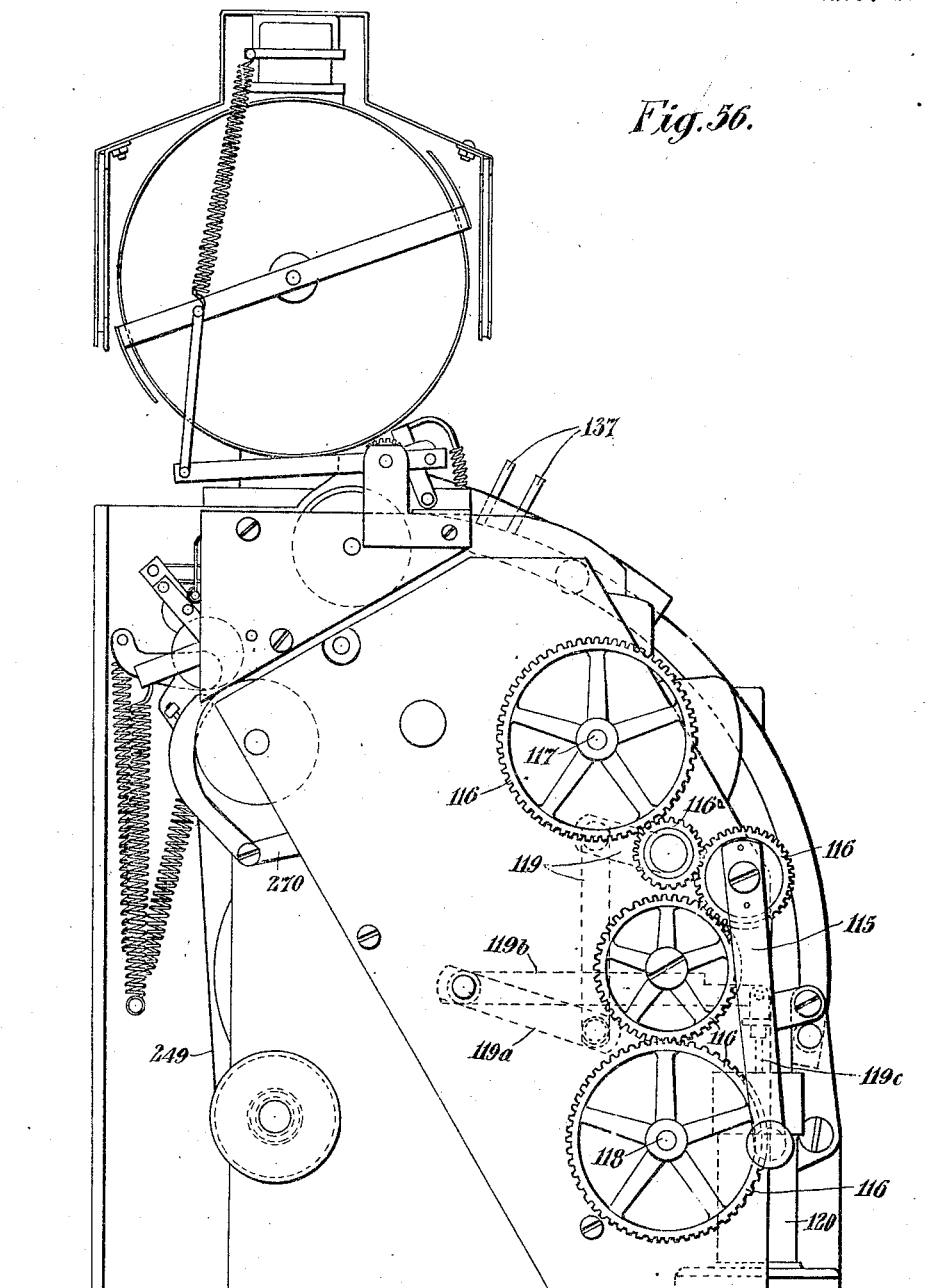

Patented May 11, 1926.

1,584,508

UNITED STATES PATENT OFFICE.

FREDERICK G. L. BOYER AND EDITH E. L. BOYER, OF DAYTON, OHIO, ASSIGNORS, BY MESNE ASSIGNMENTS, TO DAYTON SCALE COMPANY, OF DAYTON, OHIO, A CORPORATION OF NEW JERSEY.

SCALE.

Application filed February 4, 1922. Serial No. 534,038.

The present invention relates to an improvement in the device shown in Boyer and Boyer Patent No. 1,338,282.

In the weighing scale art various attempts have been made to provide a device for a weighing scale which would give readings of the product of the weight upon the scale and the price of the commodity weighed in such a manner that the result could be displayed upon rotatable indicators and type carriers from which a printed record could be taken.

Attempts have also been made to provide a recording mechanism which would accurately record the weight of a commodity when weighed upon an automatic scale.

The solution of such problems has presented many difficulties, among which may be mentioned the weak inherent motive power in a weighing scale. Interference, even to minor degrees, with the free movement of the parts causes inaccuracies in the indicated or recorded result. Difficulty is also experienced in providing a suitable multiplying mechanism which will properly and accurately take care of the plurality of various multiplications required for commercial weighings with customary price and weight ranges.

The present invention is directed to the provision of a machine which will obviate the difficulties previously experienced with machines of this type, and provide both for an accurate taking off of the weight from the scale, and also provide an accurate multiplication of weight and price to the nearest cent of the product.

Other detailed objects of the invention will be more fully set forth in the specification and drawings, which show a preferred embodiment of the invention, and in the appended claims.

In the drawings,

Fig. 1 is a front view of the machine with the casing removed.

Fig. 2 is a detail sectional view taken on line 2—2 of Fig. 1 and showing the capacity weight indicator.

Fig. 3 is a rear view of the machine.

Fig. 4 is an end view looking from the left of Fig. 3.

Fig. 5 is an end sectional view of the computing section being taken on line 5—5 of Fig. 1 and showing the price setting and computing devices.

Fig. 6 is an enlarged detail view taken on line 6—6 of Fig. 1 and showing the price setting lever and its cooperating controlling devices.

Fig. 7 is a detail sectional view taken substantially on line 7—7 of Fig. 6.

Fig. 8 is a detail view taken substantially on line 8—8 of Fig. 6.

Figure 43:
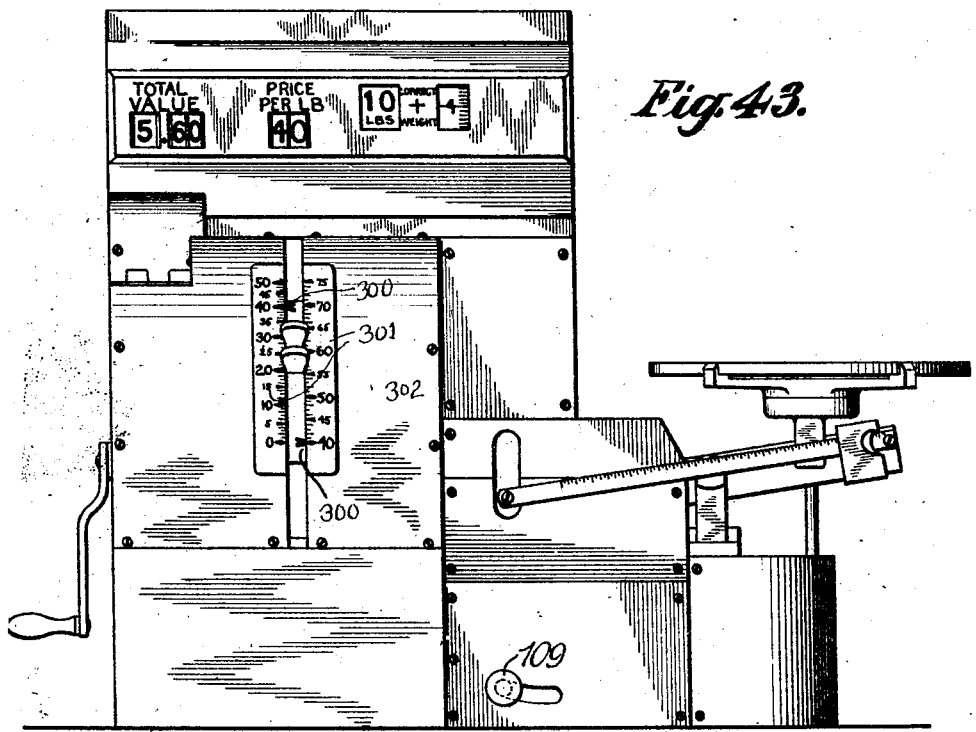

Figs. 9, 9ª and 10 (Sheet 13) are detail views of the pinch lever locking devices. These views show certain of the parts of Fig. 6 on a larger scale and in various displaced positions.

Fig. 11 (Sheet 6) is a top view of the ratchets for the pinch lever device, the view being taken substantially on line 11—11 of Fig. 6 and looking in the direction of the arrow.

Fig. 12 is an enlarged view of certain of the parts shown in Fig. 5 and shows in detail certain of the elements of the computing device.

Fig. 13 is a detail sectional view taken on a substantially horizontal line through Fig. 12 with the associated parts in central section.

Fig. 14 is a detail sectional view of the rack and carriage, the section being taken on line 14—14 of Fig. 13.

Fig. 15 is a detail sectional view of clamping and locking devices for the scale set stop. The section is taken on line 15—15 of Fig. 16.

Fig. 16 is an elevational sectional view of the scale set stop and clamping devices. The view is taken substantially on line 16—16 of Fig. 1.

Fig. 17 is a detail end sectional view taken on line 17—17 of Fig. 16.

Fig. 18 is a further detail view taken on line 18—18 of Fig. 16.

Fig. 19 is an elevational part sectional view of the interlocking devices for preventing the operation of the computing section of the machine until the scale comes to rest. The section is taken substantially on line 19—19 of Fig. 21.

Fig. 20 is a detail of the ratchet locking wheel.

Fig. 21 is a view of the parts shown in Fig. 19 looking from the right.

Fig. 22 is a detail of the locking dog used in the mechanism shown in Fig. 19.

Fig. 23 is an enlarged detail view of certain of the parts shown in Fig. 5 with certain mechanism removed. This view shows the controlling devices for the price indicators in displaced position and in cooperation with their differential segment plates.

Fig. 24 is a detail of one of the pawls showing the same displaced into cooperation with the stepped segment.

Fig. 25 is an end view of the vernier device with the cover plate removed. This view is taken substantially on line 25—25 of Fig. 26.

Fig. 26 is a central vertical section of the vernier device, the section being taken on line 26—26 of Fig. 25.

Fig. 27 is a detail sectional view taken on line 27—27 of Fig. 25.

Fig. 28 is a detail sectional view taken on line 28—28 of Fig. 25.

Fig. 29 is a detail sectional view taken substantially on line 29—29 of Fig. 1 and shows the units section of the computing machine, also showing the control of the indicators and type carriers for the unit of the product.

Fig. 29ª is a plan view of the cams mounted upon one end of the cam drive shaft and more particularly relates to a top view of the cam shown in Fig. 38.

Fig. 30 is a sectional view taken on line 30—30 of Fig. 1 and showing the dimes section of the machine.

Fig. 31 shows the same parts illustrated in preceding Fig. 30 when in moved position.

Fig. 32 is a section taken on line 32—32 of Fig. 37 and shows the dollars section of the machine.

Fig. 33 is a detail showing some of the parts of Fig. 32 in a different position and illustrates the transfer control from the dimes to dollars section.

Fig. 34 is a specimen of the check printed by the machine.

Fig. 35 is an enlarged sectional view similar to Fig. 32 and taken on the same section lines with parts in moved position.

Fig. 36 is a detail view of the transfer controlling devices. The section is taken substantially on lines 36—36 of Fig. 30.

Fig. 37 is a plan view of the various controlling cams. This view is taken substantially on line 37—37 of Fig. 1.

Fig. 38 is a detail end view of a pair of the controlling discs shown in Fig. 29ª which prevent repeat operations of the machine. This view is taken substantially from the bottom of Fig. 29ª with the parts in the rear of the discs omitted for the sake of clearness.

Fig. 39 is a detail view taken on line 39—39 of Fig. 37 and shows the controlling devices for the indicators which serve to release the indicators at the commencement of an operation. This view also shows means for operating the flash.

Fig. 39ª is a view similar to Fig. 39 with certain parts in moved position.

Fig. 40 is a perspective view of indicator racks and pawls and restoring devices.

Fig. 41 is a vertical sectional view of the indicator assembly taken on line 41—41 of Fig. 4 and showing the interconnection between the front and back indicators.

Fig. 41ª is a detail view taken on line 41ª—41ª of Fig. 41.

Figure 42:
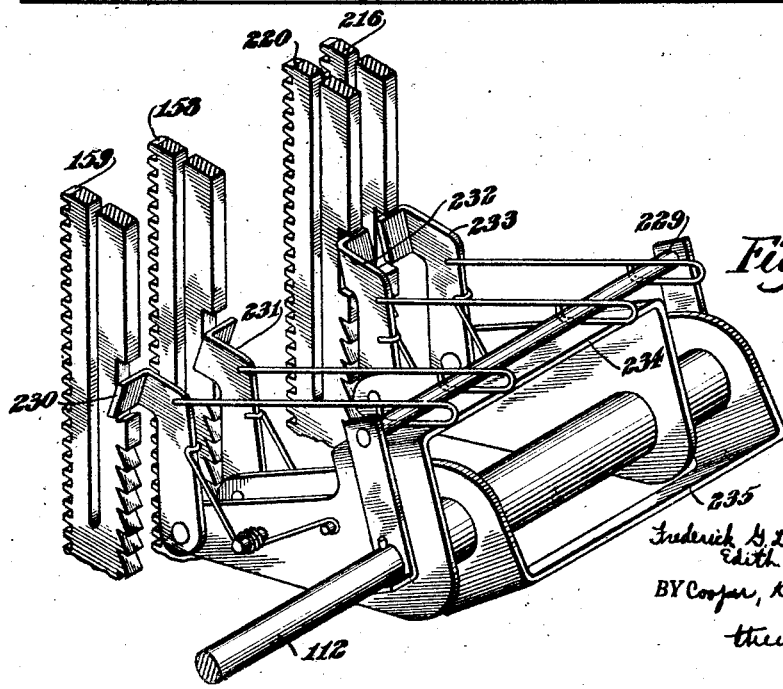

Fig. 42 is a perspective detail view showing the mechanisms of adding in a product of a predetermined weight and a variable price to the product and for setting up the result upon the product indicators.

Fig. 43 is an assembly view of the machine taken from the front with the cover in position.

Fig. 44 is a sectional view taken on line 44—44 of Fig. 1 and shows the connections from the indicator to the printing type carriers and also shows in plan the controlling devices shown in perspective in Fig. 42.

Fig. 45 is a view of the inking ribbon feeding devices.

Fig. 46 is a top plan view of these devices.

Figure 47:
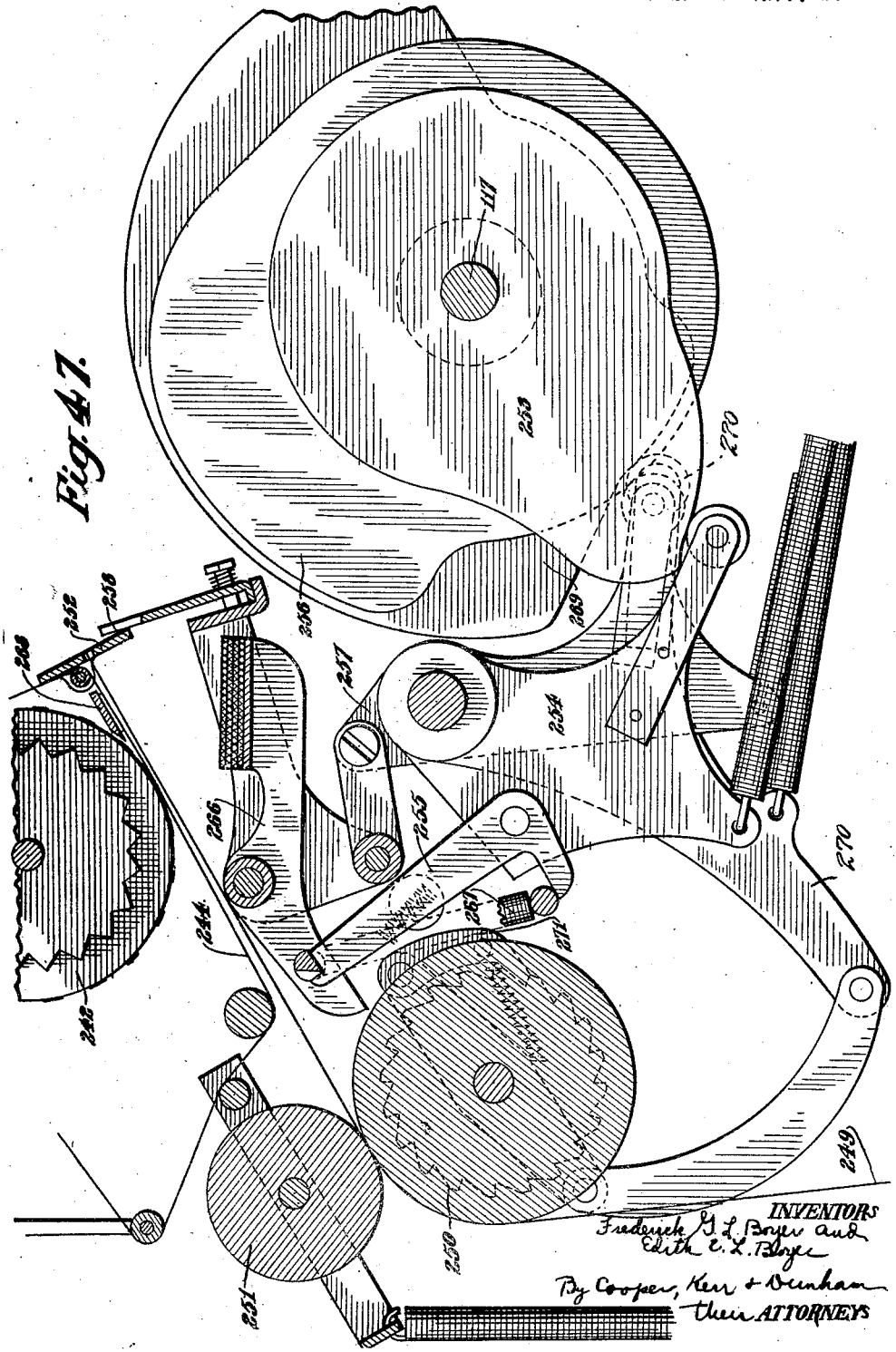

Fig. 47 is a sectional view taken on line 47—47 of Fig. 37 and shows the details of the printer mechanism.

Figure 48:
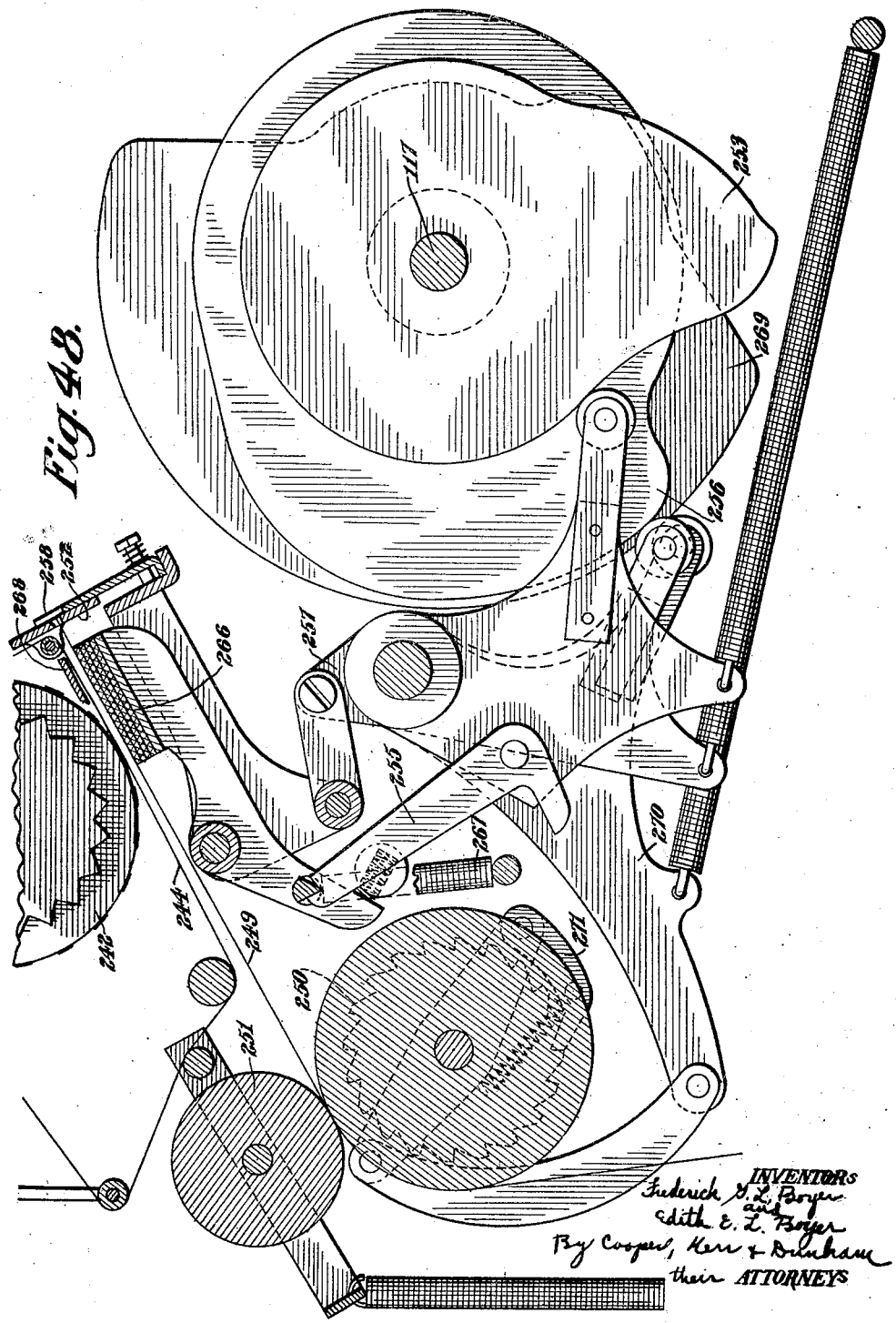

Fig. 48 shows the same parts in moved position.

Figure 49:
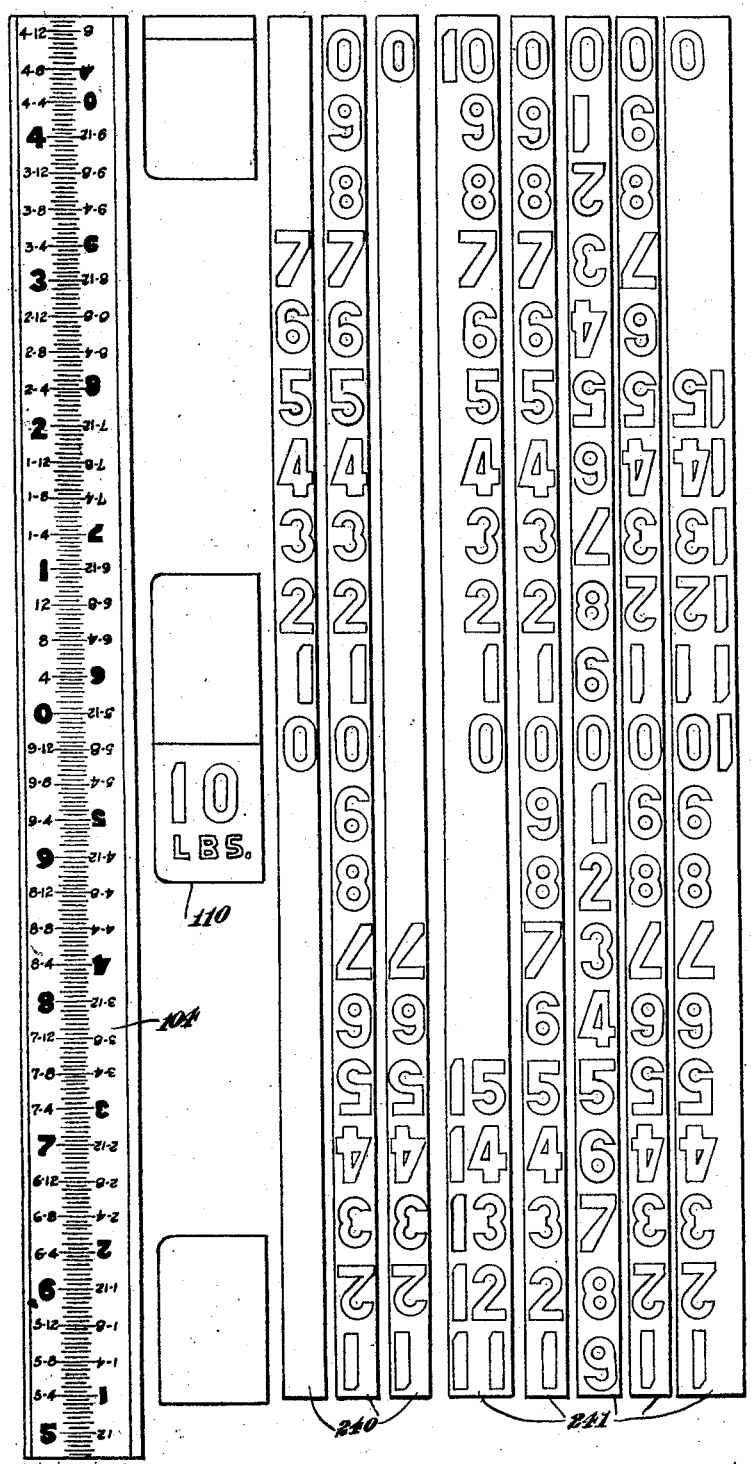

Fig. 49 is an enlarged developed view of the indicator.

Fig. 50 is a diagrammatic view showing the multiplying principle used in this machine.

Fig. 51 is a view similar to Fig. 12 but with the multiplier device displaced into cooperation with the scale set stop. This view also shows the carrying structure for the scale set stop and the connection between the price setting lever and the differential plates for controlling the price per unit of weight indicators.

Fig. 52 is a detail sectional view taken on lines 52—52 of Fig. 51.

Fig. 53 is a perspective view showing the transferring devices for effecting transfers from the dimes to the dollars rack. This view is substantially similar to Fig. 33 but shows the parts more clearly in perspective.

Fig. 54 is a diagrammatic view which shows diagrammatically the various essential elements of the machine and the functions thereof.

Fig. 55 is a timing diagram of the machine.

Fig. 56 is a left-hand view of the machine and shows particularly the operating handle, the gearing for transmitting movements of the handle to various parts of the mechanism, and the connections between the handle and the dash-pot for regulating the movements of the handle.

To assist in understanding the construction and mode of operation of this machine, a brief description of the same as a whole will be given prior to the detailed description of the various parts.

The machine comprises an automatic weighing scale and a computing printing and indicating machine. The scale is adapted to weigh the goods in the usual way and display the weight upon a suitable indicator. The scale also positions a stop which by its position controls the extent of operation of the recording, indicating and computing devices. The computing device, which is controlled by this stop, is manually operated to an extent determined conjointly by the scale stop and by a price setting device. Before the computing device can be operated the scale must come to rest, a locking device acting to prevent such premature operations, and just before the computing operation commences a second lock locks the scale set stop in the position which it had assumed under the applied load. The manually operated computing device sets up the result of the computation upon a vernier wheel from which the cents reading of the product is taken thereby securing accuracy to the nearest desired unit of measurement. Suitable devices are also provided for taking readings of the dimes and dollars in the product. The product or computed cost, as well as the price per unit of weight for which the price setting device has been set up, are set up upon suitable indicators to display the amounts at both the front and back of the machine. Similar amounts are also set up on type carriers from which a printed record is made preferably upon a ticket or check which shows the result of the computation and the price factor therein. Provision is made for the retaining of the indication until the commencement of a second operation and during the turning of the indicators they are obscured by a suitable flash.

For weighing large amounts and computing and recording the value of the same, provision is made for applying a capacity weight to the scale to take care of a part of the applied load. This capacity weight applying device is provided with suitable operating connections to the indicators to cause the product of the weight offset by the capacity weight and the price per pound to which the price setting device is adjusted, to be set up upon the product or cost indicator. To this amount there is accumulated the product as set up by the multiplying mechanism with the result that the amount finally displayed and recorded shows the monetary value of the goods being weighed.

By utilizing this capacity weight device and splitting the computation in this manner a more exact and simpler multiplication is attained than would be secured if the multiplication were entirely handled by the multiplying device per se.

Furthermore, range of the computing multiplying device is kept low, thereby increasing the accuracy of the machine. However, the ultimate indicating and printing capacity of the product values is high, thereby affording provision for a machine which is commercial in its range of operation.

Suitable interlocking devices are provided to prevent improper operations. Among these may be mentioned, first, the scale interlock which prevents the operation of the computing section while the scale is in motion; second, the price per pound interlocks which prevent the starting of the machine until the price setting device is accurately positioned and which also prevent any readjustment of the price lever after the operating handle has been started in operation.

Any desired form of automatic scale may be used for weighing. It is only essential that a part be variably displaced in accordance with the applied load. In Figs. 1 and 3 the scale is shown as comprising a fulcrumed beam 100 provided with a suitable tare beam 101 and supporting a goods support or platform 102. The usual automatic counterbalance 103 is connected to the beam and is here shown as a spring counterbalancing device. A rotary weight indicator 104 (Fig. 49), preferably having back and front weight graduations, is driven from the beam in the usual way by a rack and pinion 105. To offset load in excess of the capacity of the automatic counterbalance, a capacity weight device is provided. As here shown this comprises a weight 106 carried by a forked arm member 107 which is adapted to be rocked to deposit the weight in V-notches in the beam. The capacity weight device is normally held to retain the weight off the beam by means of a spring latch 108, Fig. 1, which is released by turning the handle 109 when the capacity weight is to be deposited upon the beam.

A suitable capacity weight indicator 110 is provided which is swung to indicating position by a link 111 which connects to a rock shaft 112 which in turn is linked to the capacity weight device.

The main operating handle 115 (Figs. 1, 3, and 56) drives, through gearing 116, the cam shaft 117 and secondary cam shaft 118.

One of the gears of the gear train 116, preferably the small idler gear 116$^a$ (see Fig. 56) which makes a plurality of revolutions for a single revolution of the operating handle 115, is connected by an arm and link 119 to a pivoted arm 119$^a$ rigid with an arm 119$^b$, the latter arm being connected at its forward end to the plunger 119° of the dash-pot 120. These connections are so arranged that for each full turn of the operating handle 115 the small gear and its connected arm 119 will make a plurality of rotations thereby causing a corresponding number of reciprocations of the dash-pot piston, and rendering the dash-pot effective to restrain excessive speed of operation of the handle and of the machine parts driven therefrom.

Referring now to Figs. 1 and 19 to 22 inclusive: To prevent the operation of handle 115 until the scale comes to rest, and still not interfere with the free movement of the scale, there are provided two interconnected dash pots 121, 122, of which the former has its piston connected to beam 100, and the other has its piston connected to a T-shaped pivoted lever 123 which carries a latch piece 124 which is arranged to catch in ratchet teeth of a controlling wheel 125 mounted upon secondary cam shaft 118, when the scale is in motion, and be free from said wheel under equilibrium conditions. For a further description of this device, reference may be had to Patents No. 1,338,282, and No. 1,449,162.

In a machine of this class the scale automatically and differentially positions a scale stop, and it is from this stop and in accordance with its extent of displacement by the scale, that readings are taken which in turn control the action of the computing, indicating and recording devices. It is therefore important that the scale set stop be not displaced from its weight set position either when the reading is being taken or at the time the stop is being locked. In order to provide such a construction the stop 113 (shown in Fig. 16 in the form of a cam element) is mounted upon a carrying frame 114. (See also Figs. 51 and 52.) This rectangular frame is preferably mounted upon knife edges 114$^a$ which are carried by beam 100, and is preferably maintained in substantially vertical position by a check link 114$^b$ (see also Fig. 3).

In order to firmly clamp the stop without changing its position during the clamping operation and to thereafter maintain the stop in exactly the position in which it has been initially clamped, the devices shown in Figs. 15, 16, 17 and 18 are provided.

Frame 114 is adapted to be clamped by clamping jaws 126, 127, which are disposed adjacent the frame (see Fig. 15). These jaws are carried by members 128, 129, which are relatively slidable. Members 128 and 129 are also shiftable relative to supporting guides 130 (see Fig. 18). These members 128 and 129 are provided with reversely threaded lug portions to engage the right and left hand threads of a shaft 131. Depending upon direction of the rotation of this shaft, the clamps 126, 127 will be engaged or disengaged. To avoid shifting the scale stop, the engagement of the clamps must be both simultaneous and in a perpendicular direction to the frame surface. The former adjustment is secured by means of end thrust bearings 132 for shaft 131 and the latter by adjusting the guides 130 relatively to the supporting frame. Preferably the alignment of the guides is secured by shifting them relatively to supporting frame 130$^f$. The proper alignment being once secured it is retained by tightening screws 130$^a$. Slack in the guides is taken out by means of screw 130$^b$. By properly aligning these guides and taking out play therein, the displacement of the frame 114 and its stop element 113 can be prevented during or after the clamping operation, since the clamping jaws can be brought into simultaneous and normal contact with the frame 114. The surface of the frame and the jaws should preferably be smooth so as to provide an extended gripping surface of such character that slight displacements of the frame will not occur at the time of clamping.

Actuation of shaft 131 to effect clamping is effected by a spring 133 when the cam 134 on shaft 118 passes the follower (see Fig. 16). The clamping action is supplemented by an inertia weight 135 which acts to cinch the clamps and prevent slipping of the frame 114 relatively thereto. The prevention of this slipping of the clamp is important, as otherwise inaccurate readings would be taken from stop 113.

Prior to the actuation of the handle 115 to effect the clamping of the scale stop 113, the price setting device must be manipulated to set up the price per pound. This setting may be made before or after the weighing of the goods but cannot be changed once the handle 115 is started in operation.

Referring to Figs. 5 and 6, the price setting device comprises a pinch handle lever 137 carried by a frame 138. This frame is pivotally mounted to be rocked about a boss 139 (see Fig. 26) which forms the hub of the vernier device. Suitable take-up devices in the form of V-bushings and collars are provided to take up wear and lost motion at this point. The angular position of frame 138 controls both the multiplication operation (changing the angle of a multiplying member relative to the scale stop) and also controls the setting of the price per pound indicator.

It is important that the frame 138 be accurately positioned and that play and lost motion due to wear be minimized. I therefore provide an accurate locating ratchet 140 (Figs. 7 and 10) having accurately cut and located teeth—one for each price per pound, and a finding ratchet 141 having a similar number of teeth. Upon pinching the pinch lever an arm 143 is rocked, thereby swinging the pivoted locating pawl 142 from engagement with the locating rack 140 (Figs. 7 and 9) to disengaged position (Fig. 10). Concurrently the upper edge of the pawl contacts with and swings the arcuate member 144 outwardly to the dotted line position, Fig. 6. This member, through the linkage shown in Fig. 6, swings a block 145 into a notch in locking cam 146 carried by shaft 118, and prevents the operation of the handle when the lever 137 is thus pinched.

The pinch lever can be now shifted to any desired price position. While the lever is pinched sufficiently to hold locating pawl 142 entirely free from locating rack 140 a tail 147 on arm 143 has contacted with the blocking pawl 148 and swung it from the blocking position over finding roller 149 (Fig. 9) to non-blocking position (Fig. 10). The purpose of the roller 149 and blocking pawl is to prevent the shifting of the lever until the locating pawl is entirely withdrawn from rack 140. This prevents wear on locating ratchet 140 and pawl 142. When the parts are in the position shown in Fig. 10 a tail on pawl 148 has compressed spring 150 thereby resiliently engaging roller 149 and finding ratchet 141. In this position of parts the pinch lever can be shifted and the finding roller will click over the notches and find the proper position for the locating pawl 142 to engage a notch in ratchet 140. When the proper notch is found by observing the position of a pointer 300 carried by frame 138 and moving over an index plate 301 or casing 302 (see Fig. 43) the pinch lever is released, thereby re-locking the parts as shown in Fig. 9 and withdrawing obstuction 145 from notch 146 so that the handle 115 can be operated. Shortly after the handle operation is commenced, cam 146 will cam up the roller on block 145 thereby depressing arc-shaped bar 144 centering locating pawl 142 accurately in the selected notch and prevent the re-shifting of the pinch lever until the operation is completed (see Fig. 6). The locating pawl also accurately centers the parts in alignment with the selected price notch.

Price indicators.

An arm carried by frame 138 carries a roller engaging in a segment frame 151 (Figs. 23 and 51), which frame is mounted so as to be horizontally slidable to various positions by rocking the pinch lever 137. Fig. 23 shows the parts at a later time in the machine cycle when this frame is locked against movement by the locking devices for the pinch lever which are controlled by cam 146 previously described.

The segment frame 151 includes two differentially stepped plates 152 and 153. The former has seven steps and is the dimes segment and the latter having in all seventy-five steps consisting of seven groups of ten and one group of five steps. This plate 153 is the units segment. Disposed above the stepped plates and pivotally mounted so as to be adapted to be rocked down into contact with the stepped plates 152 and 153 are units and dimes pawl arms 154 and 155. During the setting of the pinch lever, these pawl arms are elevated clear of the segment plates, i. e., in anticlockwise position from that shown in Fig. 23, so that the plates may be set to the proper valued positions by the pinch lever. The elevating of the pawl arms to clear position was effected during the preceding indicator setting operation of the machine by means of a restoring bail 160 which is actuated by a link 161 connected to a follower cooperating with the cam 162 (Fig. 5) on shaft 118.

The pawl arms 154 and 155 extend rearwardly and carry spring-pressed pawls 156 and 157 which in turn cooperate with price indicator rack rods 158 and 159 (Figs. 23, 40 and 42). These rack rods mesh with indicator and type driving gears 164 and 165 (Fig. 44).

In the operation of the machine the first step in the indicating cycle is to release the indicators set upon the previous operation and restore them to zero. Referring now to Figs. 39, 39ª and 40: Extending back of the tails of all of the indicator pawls is a spring restored bail 166 which is actuated by a cam 167 on shaft 117, and by a linkage 168 and camming member 169 to release the pawls and allow the indicator rack rods to drop. The actuation of the parts by cam 167 takes place before the pawl arms 154 and 155 are released by their controlling cam 162. Suitable springs 300ª shown in Figs. 29, 30 and 35 may be used to aid gravity in lowering the rack rods. Following the release of the indicator pawls by bail 166, any indicator rack rods which inadvertently remain up are positively lowered by a bail 170 which extends through slots 171 in all the rack rods. This bail is depressed to the lowermost position thereby carrying down any raised rods by link 168 and cranks 172 supported by shaft 173. During the restoration and re-positioning of the indicators they are covered by means of a flash 174 which is operated by a spring and controlled by cam 167. The foregoing indicator-restoring cycle is identical for all the indicators in the machine.

To set up the price indicators after they are restored to zero, the handle 115 is further advanced causing cam 162 to be turned to elevate restoring bail 160 and to permit the pawl levers 154 and 155 to rock clockwise under the spring power until they are differentially arrested by the stepped stop plates 152 and 153. Fig. 23 shows this position of the parts. Pawls 156, 157 click over the teeth of the ratchets or rods 158 and 159, and eventually bail 160 restores the pawl levers, thereby differentially elevating the price indicators in accordance with the price to which the pinch lever has been set.

Multiplying device.

Referring again to Figs. 12, 13, 51 and 52 and 26: The frame 138 has adjustably fastened to it a V-guide 180. Below this guide and spaced from it are a pair of upwardly facing guides 181. Intermediate the guides is a carriage 182 having suitable grooves to receive ball bearings 183. Parts 181 are in effect floating guides being resiliently pressed upward by springs 184 to bring the carriage lightly into contact with the upper guide. The line of the fixed guide may be adjusted by suitable shims. The carriage 182 carries a downwardly facing rack 185 which may be adjusted longitudinally relative to the carriage by the screws 186 and clamped by screws 186ª. The carriage 182 also carries a straight edge 187 which is adapted to contact with the scale set stop 113 and limit the movement of the carriage. The travel of the carriage is proportional to two factors, one the vertical displacement of the scale set stop, the other factor is the angle of guide 180 with the vertical line of displacement of said stop. The actual travel of carriage 182 is proportional to the product of these factors, which serves as a means for effecting multiplication of one of a variety of weights with one of a plurality of prices per pound. This multiplying device differs from previous devices of this character in that the straight edge which contacts with the scale cam stop is always substantially at right angles to its own direction of movement, which obviates the objectionable wedging action heretofore present in devices of this kind. This wedging of the parts has always magnified errors and made the product frequently inaccurate, particularly after wear occurs.

This device differs from previous devices in that the pivot on which the straight edge swings and the lock for holding it at the proper angle with the line of movement of the carriage are eliminated from the moving carriage, thus making possible a lighter and more rigid construction and preventing errors due to the difficulty of making a firm lock for the price angle on the moving carriage.

Rack 185 meshes with a pinion 188 upon a vernier shaft 189 (Fig. 26). This shaft also carries a driving pinion 190 and is suitably mounted in ball bearings carried in hub 139. Meshing with pinion 190 is a drive gear sector 191, Fig. 35. This drive sector is actuated by a spring 192 and controlled by a cam 193 upon shaft 117. At the proper time in the operation of the machine the spring 192 actuates the sector 191, turning the vernier shaft 189, thus rotating pinion 188 anticlockwise, sliding rack 185 (Fig. 12) to the left and displacing multiplier bar 187 to the left until the bar contacts with the scale set stop 113, as shown in Fig. 51.

The law of operation of the multiplier device 187 will now be described with reference to Fig. 50.

Referring now to Fig. 50, lines A—O, B—O and C—O represent the position of the price setting lever and the direction of travel of the multiplying bar corresponding to 0, 45 and 75 cents per pound, 113ˣ, 113ʸ and 113ᶻ represent the scale stop in zero weight, 5 pounds and 10 pounds positions, respectively. 187ª, 187ᵇ and 187ᶜ represent the positions of the multiplying bar when the price setting device is in 0, 45 and 75 cent positions. 185ᵇ and 185ᶜ represent rack positions for 45 and 75 cent positions. Angle 187ª—187ᶜ=angle AOC=φ. The distance n represents dead or ineffective clearance travel of the multiplier and is the same irrespective of the price position of the bar. The design and construction are such that (disregarding dead travel n), according to the law of sines $$\sine \phi = \frac{\text{computed value (i. e. product in inches)}}{\text{weight in inches}} \times \sine Z$$

In the above Z is the angle the straight edge 187 makes with respect to the pitch line of the rack 185 and this amount is a constant. Therefore, since φ is proportional to price per pound and equal to the price per pound times a constant.

The contour of cam 113 is important as it compensates for the travel of the multiplier bar 187 away from cam due to the precession of the rack 185 when the same is displaced about pinion 188. It will be remembered that pinion 188 is fixed during the price setting, and therefore the rack and connected bar 187 are displaced relatively to 0 during the setting for the price. The addendum on cam 113 takes care of this change in position of bar 187.

This arrangement of multiplying device has the additional advantage that when the bar and the stop move into relative contact the direction of relative movement is always one of translation and in the direction of that radius of curvature of the curved element which passes through the ultimate point of contact. Otherwise stated, the direction of travel of the straight edge is always substantially at right angles to the contacting surface instead of at a more or less acute angle thereto as in prior construction. With such contact there is no tendency to wedge or displace the multiplying bar upon contact with the stop.

Vernier device.

In order to take the readings of the movement of the multiplier bar 187 provision must be made for accurately measuring the movement of this bar. In commercial machines the movement of this bar for capacity products is approximately two inches. This two inches of movement represents 750 cents of product and consequently each cent in the product is represented by slightly less than .003 of an inch of movement. Suitable provision must be made for measuring comparatively minute increments of movement of the multiplier bar. For this purpose a vernier device is provided which in principle and mode of operation is similar to the vernier described in Patent No. 1,338,282. The specific vernier device herein employed is in some respects simpler than the vernier shown in the patent but its mode of operation is identical therewith. The present vernier mechanism is carried in a suitable casing and comprises a notched vernier wheel 194 (Fig. 25) carried on shaft 189 and having a plurality of equal spaced sets of notches. Slidably mounted in the vernier casing are a plurality of pawls 195. These pawls are so disposed in the casing that they are in vernier relation to the notches of vernier wheel 194. The various pawls 195 cooperate with the common cam ring 196 and by actuating this cam ring by means of a spring and linkage 197 which extends to a follower cooperating with the cam 198 (Fig. 29), the various pawls may be spring-pressed into contact with the vernier wheel 194. Such pawl or pawls as align with the notches in the wheel drop into the notches and serve to limit the movement of a finger arm 199 and thereby control the cents product indicator and type wheel. Finger arm 199 is carried upon a short stub shaft 201 carrying a pinion 202 meshing with a spring driven sector 203 (Fig. 29) which is in turn controlled by cam 204. Should the travel of the vernier wheel be one-half of one unit (cent) or ten and one-half or twenty and one-half units, the 0 vernier pawl 195° and the 1 pawl 195' would simultaneously drop into the notches and since the arm 199 is to pass 0 before the 1 pawl, the former would arrest the arm and the unit wheel would print 0 where it should print 1. Although usually this would be immaterial since it would only occur where the travel terminated at exactly the half unit, means is provided to prevent it, comprising an interlocking member 200 cooperating with pawl 195' and arranged so that when the 1 pawl drops in, the member 200 will lock up the 195° pawl before this pawl is released by the cam member 196.

Sector 203 is extended to carry a pawl 205 which engages with the ratchet teeth of rack rod 206. The operation of this indicator and printer section is the same as before described, except that the dropping of the pawl is controlled in its extent by the vernier wheel and the restoration, to position the indicators and type carriers, is effected by cam 204 on shaft 117.

The dimes section of the product indicators is best shown in Figs. 30, 31, 25 and 26. Fastened to the vernier wheel is a stepped disc 207 (Fig. 25) which is adapted to control the extent of descent of two plungers 208, 209. Unlike the units section, there are two pawl levers 210 and 211 and two dimes pawls 212 and 213 cooperating with a common dimes rack rod 216. Plunger 208 is connected to lever 210, and 209 to 211. For restoring the pawl levers there is provided a common actuator 214 which is spring-retracted and restored by the dimes cam 215. To selectively determine which plunger and pawl is to be actuated, a claw rocker 217 is provided which is engaged into a notch in one or the other of the plungers 208 or 209 (see Fig. 27). The claw rocker is provided with a pin portion which extends into a slot 218 in the units sector 203 (Fig. 29). The arrangement of the parts is such that with unit indications of from 0 to 4, plunger 209 will be locked and 208 free to drop. With unit indications from 4 to 9, 208 will be locked and 209 will be free to drop to contact with stepped disc 207. The multiple plunger arrangement, with selective control from the unit sector, prevents erroneous indications which might occur with a single plunger when the stepped wheel assumed an intermediate position, so that the single plunger might descend an additional step or not. In effect the action is the same as would be secured with a slight shifting of the stepped disc so that edge impingement of the plungers with the steps would be obviated.

Dollars section.

The dollars product indicating and printing setting section is best shown in Figs. 32, 33 and 35. 220 is the dollar rack, 221 the dollar pawl which is carried by and has its setting determined by dollar sector 191 and spring 192. These parts cooperate with pinion 190 on vernier shaft and are displaced proportionally to the dollars and fraction of dollars in the product. Setting of indicators and type carriers is secured by means of a dollars cam 193 which also serves to restore the multiplying member to home position. With a dollar indicator device of this sort controlled by a pinion having the innumerable positions of pinion 190, there is a possibility of erroneous indications when the dimes rack rod approaches the 9 or zero point. To prevent such improper action the dollar rack is arranged to descend a half a tooth below the zero point when the pawl 221 is released by indicator releasing bail 166 previously referred to. With dimes rack rod in less than five position, (i. e. 0–4), the dollar rack will be lifted one half tooth so that when the dollar pawl 221 is restored it will catch the next higher value ratchet tooth. When dimes are from 5 to 9 the dollar rack is left undisturbed in lower position so that the dollar pawl will not catch the higher value tooth. The above is controlled by tails 223 on the dimes arms 210 and 211 that cooperates with a notched abutment 223ª on transfer pawl lever 224 and transfer pawl 225. Actuation of transfer pawl lever 224 is effected by transfer cam 227 only when one of the tails 223 is over recess 223ᵇ as shown in Fig. 32. Under these conditions the dollar rack rod will be raised one-half tooth. If one of the tails is over the top of the abutment the transfer lever will be held out of cooperation with cam 227 and the dollar rack will not be raised one-half tooth (see Fig. 53). This inter-control from the lower order is similar in principle to the dimes control heretofore explained.

Under certain conditions when the capacity weight device is in operation it is necessary that a transfer be effected from the dimes to dollars rack rod. Assume 18 lbs. upon the scale at 73 cents a pound. With the capacity weight at 10 lbs. this computation becomes split as follows: .10×73=730 and 8×73=584. Under these conditions when adding the product upon the indicators provision must be made to transfer 1 to the dollar rack rod, otherwise the total indicated and printed result would be $12.14 instead of $13.14. Such transfers are secured by transfer pawl 225, which pawl is operated by the engagement of a raised camming portion 226 (Fig. 53) upon the lower rear face of the dimes rack rod 216 with the upstanding end of the transfer lever 224. As rack rod 216 rises lever 224 is rocked clockwise thereby elevating pawl 225 and causing the dollars rack 220 to be raised one additional tooth. To throw out the transfer pawl a finger 228 (Fig. 35) is provided which is rocked by the bail 166 into contact with the tail of transfer pawl 225 when the indicators are to be restored to zero.

With multiplying devices of this sort where large varieties of numbers are to be multiplied, it is desirable to ensure accuracy in the product to keep the range of the possible products as low as possible. For example with a scale having 20 lbs. capacity and a price range of from 1 to 75 cents, the product range is from 1 to 1500 cents. In the present embodiment the weight range for the automatic scale is reduced to 10 lbs. This makes the product range handled directly by the multiplier 750 cents. For quantities over 10 lbs. a capacity weight is applied to the scale lever in the manner previously explained.

Provision is then made for initially setting up upon the product indicators an amount equal to the value of the capacity weight times the cents value of the price per unit of weight. Then in the operation of the machine the money value of the remaining weight times the price per unit of weight is added to the amount already set up, thereby giving the total or true money value of the commodity weighed. To carry out this operation provision is made to effect the setting of the price per unit of weight indicators prior to the setting of the product indicators under the control of the vernier device, etc.

As previously explained, the application of a capacity weight to beam 100 rocks shaft 112 (Figs. 3, 4, 40 and 42). The rocking of this shaft rocks a bail 229 thereby allowing fingers 230, 231, 232 and 233 to swing against the rear of the price racks 159 and 158 and the dollar and dimes product racks 220 and 216. Upon the dropping of the racks (when the previous indication is released) these fingers drop into notches in the racks as shown in Fig. 42. Fingers 230 and 232 are connected to a common bail 234 which is loose upon a sleeve on shaft 112, and fingers 231 and 233 are carried by a similar bail 235. When the rack rods 158 and 159 are set up with the price per pound, a similar setting will be effected upon the dimes and dollars racks 216 and 220. In this way a multiplication of 10 lbs. times the price setting is obtained and the result set up directly upon the indicators and type carriers. When the supplemental product is set up upon the product rack rods, the fingers 232, 233 are cammed back out of the notches in the rack and the rods rise to the total product position.

Any desired number of indicators to give back and front indication may be employed. Figs. 41 and 49 show a convenient arrangement, the latter view being taken from the rear of the machine. Group 240 are the price indicators. Group 241 are the product indicators.

The printing type carrier may be driven in any desired manner, as by the well known nested sleeve arrangement shown in Fig. 44. In this figure 242 are the price type carrier group, which are connected to the price racks 158, 159. 243 are the product group which are individually connected to rack rods 206, 216 and 220.

Inking of the type may be effected in any desired manner, as by inking ribbon 244 (Fig. 45). This ribbon may be fed forward by means of a ratchet roller 245 having cooperating presser roll 246. The ratchet roll may be advanced by a suitable pawl 247 carried by vibrating arm 248 which forms a part of the flash mechanism (see Fig. 39).

Fig. 47 shows an embodiment of the printing section of the machine. Paper 249 advances from a supply roll, not shown, over ratchet feed roll 250, spring presser roller 251, under the ribbon 244 below the type groups (242 being here shown), and through the aperture in the fixed knife 252. At the proper time in the cycle, platen cam 253 rocks follower 254 clockwise, thereby swinging bell crank 255 counterclockwise and tripping the platen 266 which is impelled against the paper by spring 267. This impresses the price and product and any desired wording from the fixed electro 268, such as that shown upon the check of Fig. 34, upon the paper. Following the printing, feed cam 269 comes into operation and rocks its follower 270 thereby rocking pawl 271 and feeding forward a section of paper past the knives. Bell crank 255 re-engages the platen 266 and knife cam 256 actuates its follower 257 to elevate the knife 258 and cut off the check.

While the preferred embodiment is herein shown as a check printer, it will be understood that other forms of recording mechanism, such as strip printers or check and strip printers, can be used as well.

In order to prevent repeat operations of the operating handle, the device shown in Fig. 38 is used. A pair of discs 272, 273 are fixed upon shaft 118. Disc 272 is provided with a sharp notch 274 and 273 has a single camming projection 275. Normally engaged with sharp notch 274 is a spring pulled pointed pawl 276 which is connected to another pawl 277 in cooperation with disc 273. To start the machine the operator backs up on the handle 115 thereby freeing pawl 276 from notch 274. The handle can then be pulled forward and carried around through a complete cycle. Just at the end of the cycle pawl 277 will be engaged by projection 275 and will thereby swing the pawl 276 into contact with the disc 272 so that it will re-engage notch 274 and stop further rotation of the handle. Ratchet teeth 277$^a$ disposed on disc 273 cooperating with pawl 277 will also prevent the machine being turned backwards.

Referring now to Fig. 54, a brief description will be given of the operation of the machine from the placing of the weight upon the scale platform until the eventual product is displayed upon the indicators. It will be understood that a corresponding amount is also set up on the type wheels in the manner described in the foregoing specification. In order to bring out the various functions it will be assumed that the applied weight is eighteen pounds. Eighteen pounds is applied to the scale platform 102. Inasmuch as the automatic counterbalancing capacity of the scale has been exceeded the operator rocks lever 109 and applies the ten pound capacity weight 106 to the scale beam 100. This sets up ten pounds upon the capacity weight indicator 110. The eight pound weight reading is also set up upon the weight indicator 104. The differential displacement of the beam 100 in accordance with the eight pounds of weight, as displayed by indicator 104, causes a differential setting of the scale stop 113. The operator now or previously displaces the pinch lever 137 to the desired price per pound setting on index plate 301. This setting sets the multiplier bar 187 at a proper angle to carry out the to be performed multiplication. After the scale has come to rest the main operating handle 115 is unlocked and the operator commences the rotation of the handle. There is an overlapping of operations from this point in the machine cycle onward but the operation may be best understood by considering that the price indicators are first set. The manipulation of the capacity weight handle 109 has previously rocked shaft 112 (Fig. 1) and caused the fingers 230, 231 to drop against the price per unit of weight rack parts 158 and 159. A further movement of the handle releases the rack parts and the price indicators 240 are restored to zero. Concurrently the product indicators 241 are also restored to zero. A further rotation of the handle causes the price setting of seventy-three cents to be set up upon the price indicators 240. During this setting of these price indicators a transfer or cross-setting is effected on the product indicators for the dollars and dimes. Seven dollars is set up upon the dollars rack 220 and 3 representing three dimes is set up on the dimes rack 216. The operator now continues the forward movement of the handle. The multiplier bar 187 is brought up into contact with the scale set stop 113 and a motion corresponding to the travel of this multiplier bar is turned in by means of pinion 188 to the vernier shaft 189. The vernier follower finger 189 (Fig. 25) moves up until arrested by one of the pawls 195 to control the cents product indicator. This control is secured through pinion 202 and the other connections 203, etc., previously described, to the units product indicator 241. There is also taken off from the vernier shaft a reading of the dimes and dollars product. The dimes reading is taken from the stepped disc 207 and the dollars reading from the pinion 190. These readings through the instrumentalities previously described set up the dimes and dollars racks to an extent corresponding to eight steps on the dimes and five on the dollars. Inasmuch as the dimes rack has already moved three steps and now receives an additional increment of eight steps it is necessary for a transfer of one step to be effected to the dollars rack rod. Such transfer of one is illustrated diagrammatically in Fig. 54. The mechanism for effecting this transfer is shown and includes the abutment 226 of Fig. 53. A further operation of the handle completes the setting of the product indicators and displays $13.14 thereon. Concurrently with this setting of the product indicators there is a setting of the corresponding type wheels and at a slightly later time in the cycle the amount is printed from the type wheels upon the record check.

Fig. 55 shows in detail the timing sequence of the various parts of the machine. In this figure there is a vertical line for each 30° of the full 360° of a complete operating cycle of the machine and the heavy horizontal lines represent the points in the cycle where the various devices come into play, the length of time or part of the cycle during which the devices are at rest in operating or functioning position and the point in the cycle at which they are restored to their original or home position. In addition to the vertical degree lines, the diagram is in some cases marked adjacent deviations of the heavy lines from horizontal to show the point in the cycle where movement of the part occurs, this usually being the case where the movement does not take place at one of the 30° portions of the cycle. Taking the diagram comprehensively it is therefore possible to tell from it not only when a part or section of mechanism comes into play, but it is also possible to see what other parts are working or are effective at that time. Referring to this figure the first line on the diagram represents the timing in which the dash pot interlock shown in Figs. 19 to 22 is effected to control the operation of the machine.

The second line relates to the interlock for locking the pinch lever against movement after the operating handle begins to move.

The third line relates to the scale set clamp, details of which are shown in Figs. 16 to 18 inclusive.

The line marked Ind. Ret. relates to the timing of the returning of the indicators to zero prior to a new setting.

The line marked Carriage relates to the timing of the carriage for the multiplying bar and shows that this movement commences at 40° and is completed at 115°. The vernier operation commences later at 117° and the setting of the vernier is followed by a setting of the penny and dimes units of the indicating mechanism.

The transfer cam 227 commences its operation at 164° concurrently with the completion of the dimes setting. The price indicators are set up from a period commencing at 55° and their setting is completed and the parts restored at 107°. The subsequent lines of the timing diagram require no detail description.

The stop device and means for clamping the same, together with the vernier device and the connections to the indicators and type carriers, are adaptable to a wide variety of weighing scale applications in which a computing operation need not be necessarily carried out. It will be apparent that the devices herein shown may also be applied where it is desired to record and indicate upon a plurality of numeral displaying wheels, the weight of a commodity. Hereinafter, in the claims, the term number bearing elements, wheels, etc., are to be understood to refer broadly to either indicator or type wheels or equivalent means, such as sectors, racks, etc. It will be understood that the invention in its broader aspects is not limited to a computing machine in which a multiplication may be performed, but includes other more rudimentary forms of device which are controlled in accordance with the position of a stop element which assumes a plurality of controlling positions.

Among the advantages which are secured by the machine heretofore described are:

The elimination of angular price adjustment from the movable carriage and the substitution therefor for the adjustment of the carriage guides and the provision of a straight edge at a fixed angle with the carriage guides. This construction permits a more accurate and firmer price adjustment, allows a lighter weight carriage, and greatly simplifies the price setting mechanism.

Another advantage secured by the present construction is that any wedging action at high prices is eliminated since the straight edge is always approximately perpendicular to its direction of movement.

Another result obtained by the present machine is a more accurate computation and an increased scale capacity which is secured by the provision of a capacity weight and connected mechanism for giving computed results as high as double the capacity of the computing mechanism alone.

Another desirable result secured with the present embodiment resides in a simple determining mechanism for the units, tens and hundreds of the products, which is adapted to control the indicating and printing elements for the various denominations at the transition points in a more uniform and accurate manner than in previous construction.

What we claim is:—

1. In a computing scale, a multiplying device comprising two elements, means for setting one of said elements in accordance with the weight of a commodity, means for setting the other element in accordance with the price of a commodity per unit of weight, one of said elements having a curved surface, means for imparting a motion of translation to one element in the direction of the radius of curvature of the curved element through the ultimate point of contact, said curved element having a compensating curvature upon its curved surface to compensate for the precession of one of the elements during the initial setting thereof.

2. In a computing scale, two elements, means for setting one of said elements in accordance with the weight of a commodity, means for setting the other element in accordance with the price per unit of weight of a commodity, one of said elements having a curved surface and the other a straight surface, means for translating one element into abutting contact with the other element to thereby determine a linear distance which corresponds with a multiplication of weight and price factors of the computation, said motion of translation of said element being in the direction of the radius of curvature of the curved element through the ultimate point of contact.

3. In a computing scale, in combination, an element and means for displacing the same in accordance with weight, an element settable to various angular positions in accordance with price per unit of weight, said settings of said latter element being made in a plane substantially normal to the plane of travel defined by the first element and its setting means, means of imparting a motion of translation to said second element to bring the latter into abutting contact with the first element, one of the aforesaid elements having a curved surface, and said motion of translation being in a direction of the radius of curvature of the curved element through the ultimate point of contact.

4. In a computing scale, in combination, an element displaceable in accordance with the weight of the goods, a multiplying bar displaceable to various angles in accordance with the price per unit of weight, and means for displacing the said bar into substantial radial contact with said element to thereby determine by the travel of said bar the product of weight and price.

5. In a computing scale, in combination, an element displaceable in accordance with the weight of the goods, guide means displaceable about an axis which is at right angles to the path of travel of said element, a multiplying bar associated therewith and shiftable along said guide means into substantial right angle abutting contact with said element, a reading device, driving connections from said reading device to said bar, and a compensating contour upon said element to compensate for the shifting of said bar by the precession of said driving connections during the angular displacement of said guide means.

6. A multiplying device for a computing scale, comprising a guide member shiftable to various price positions, a displaceable scale set stop, a carriage having a bar thereon carried by said guide member and shiftable relatively thereto to bring said bar into cooperation with said stop, means cooperating with said carriage to yieldingly hold the same into cooperation with the guide member.

7. A multiplying device for a computing scale, comprising a guide member shiftable to various price positions, a displaceable scale set stop, a carriage mounted on the guide member and having a bar thereon to cooperate with said stop, a rack carried by said carriage, pinion meshing with said rack, and means for adjusting the position of said rack longitudinally with respect to said carriage.

8. A multiplying device for a computing scale comprising a guide member shiftable to various price positions, a displaceable scale set stop, a carriage mounted on the guide member and having a bar thereon to cooperate with said stop, a rack carried by said carriage, pinion meshing with said rack, and means for adjusting the depth of enmeshment of said rack and pinion.

9. A computing scale comprising, in combination with a scale and a multiplying device adapted to multiply price per unit of weight and weight and set up the product in denominational orders upon denominational setting devices for the reading means, means for increasing the weighing capacity of the scale, means for setting up the product of the weight by which the scale capacity is increased, and the price per unit of weight upon the corresponding denominational setting devices, whereby said setting devices accumulate a total product representing the computed value of the goods weighed.

10. A device of the class described, comprising in combination a scale, a multiplying device therefor, adapted to multiply weight and price per unit of weight, product reading devices controlled thereby to disclose the computed cost of the goods weighed, and a supplementary device having provisions for increasing the weighing capacity by a predetermined amount and for multiplying the amount by the price per unit of weight and setting up the result upon the reading devices to thereby be accumulated to the amount of the product from the aforesaid multiplying device.

11. A multiplying and reading device for a computing scale, comprising a primary multiplying device for multiplying all weights within a predetermined range by the price per unit of weight, devices for disclosing the product or computed cost thus obtained, a second multiplying device adapted to directly multiply a predetermined weight by the price per unit of weight and set up the product directly upon the product disclosing devices, and means for accumulating the products upon said disclosing devices and showing the sum thereof.

12. A multiplying and reading device for a computing scale, comprising a product disclosing means, said means comprising denominational order elements to together show a product having the numbers thereof arranged in denominational order, a price setting device, a weighing device and a multiplying device adapted to multiply the weight of the goods upon the weighing device by the price set up by the price setting device, means for setting up the product from said multiplier upon the denominational order elements of the disclosing means, a supplementary multiplier adapted to directly multiply the price set up by a large weight value and obtain a product thereof, means for setting said last mentioned product upon the denominational order elements of the disclosing means, and means for accumulating the sums of the products thus set up and disclosing the resulting total product.

13. A computing multiplying scale, comprising a price setting device, product disclosing means, a multiple multiplying device adapted to multiply weight by price and obtain computed cost, said device comprising means for multiplying a portion of the weight by the price set up and obtaining a sub-product, means for multiplying another portion of the weight of the goods by the price set up and obtaining a sub-product, and means for accumulating the said sub-products and setting up the resulting total product upon the product disclosing means.

14. A machine comprising, in combination, a weighing scale, a multiplying device, means for controlling the same conjointly in accordance with the price per unit of weight and the weight upon the scale, a product displaying means adapted to show the product thus obtained, means controlled conjointly in accordance with the variable prices to which the multiplying device is to be set and in accordance with a predetermined weight amount for setting up upon said displaying means a sub-product, means for accumulating said sub-product and product from the multiplier and means for effecting a transfer from lower to higher order in said displaying means during said accumulation therein.

15. In a computing scale, a product indicator device comprising a plurality of numeral wheels for varying denominational orders, means for setting up therein a product of price and weight, means for also setting up therein a supplementary product of price and weight, means for accumulating said products and effecting transfers from lower to higher order wheels, and weighing and price setting devices controlling all of said means.

16. In a device of the character described, the combination with calculating mechanism of a manually adjustable device for controlling calculations by said calculating mechanism, a lock for said device, means carried by the device whereby the lock may be released to free the device for adjustment, a finding roller moving with the adjustable device and a stationary finding rack cooperating with said roller, and means comprising a spring tensioned by operation of the lock releasing means to force the finding roller into firm contact with the finding ratchet.

17. In a device of the character described, the combination with calculating mechanism, of a manually adjustable device for controlling calculations by said calculating mechanism, a lock for said device, means carried by said device for operating said lock to free the device for adjustment and to lock the device in adjusted position, a finding roller moving with the adjustable device and a stationary finding rack cooperating with said roller, means comprising a spring tensioned by unlocking operation of the lock releasing means to resiliently hold the finding roller in firm contact with its cooperating rack, and means whereby locking movement of the lock releasing means will lock said roller in engagement with its rack.

18. In a device of the character described, the combination with calculating mechanism, of a manually adjustable device for controlling said mechanism, two locks normally preventing displacement of said device, manually operable means carried by the device for rendering said locks effective and ineffective, and means whereby rendering said locks ineffective will render an element of one of the locks effective to serve as a resilient finder in effecting accurate adjustment of the controlling device.

19. In a device of the character described, the combination with calculating mechanism, of driving mechanism for said device, a manually adjustable device for controlling the operations of the calculating mechanism, two locks normally preventing displacement of said device, manually operable means for rendering said locks effective or ineffective and devices for preventing operation of the driving mechanism when either of said locks is ineffective.

20. In a computing scale in combination with a multiplying device, a price setting means therefor, comprising a manually set member, a finding ratchet and a locating ratchet, locating means associated with the manually set member cooperating with both said ratchets, said locating means having provisions for preventing the shifting of the manually set member until the locating means is entirely withdrawn from the locating ratchet.

21. In a computing scale in combination with a multiplying device, a price setting means therefor, comprising a manually set member, a finding ratchet and a locating ratchet, locating means associated with the manually set member cooperating with both said ratchets, said locating means having provisions for bringing a finder into cooperation with the finding ratchet when the locating means is entirely withdrawn from the locating ratchet to thereby find the proper price position during the setting of the manually set member.

22. A price setting device, comprising in combination with manually adjustable price setting means, a locating ratchet and a finding ratchet, a locating means and a finding means cooperating respectively with the locating ratchet and the finding ratchet, said finding means and ratchet having provisions for preventing a rubbing engagement of the locating means and its ratchet during the adjustment of the price setting means.

23. In a device of the class described, a price setting device comprising in combination, a pinch lever, a locating ratchet and a finding ratchet, means cooperating with the pinch lever and the finding ratchet to prevent the shifting of the pinch lever until the pinch lever is pinched, locating means cooperating with the locating ratchet, and means for withdrawing said means from the locating ratchet when the pinch lever is to be shifted.

24. In a device of the class described, in combination with a displaceable stepped member and number bearing means, certain of which are positionable in accordance with the value of the steps of said member, means for controlling the displacement of said means from said stepped member, comprising a plurality of displaceable elements in alignment with the steps on the member, and means for selectively controlling which element is to be displaced into cooperation with the stepped member.

25. In a device of the class described, in combination with a displaceable stepped member, a plurality of number bearing elements each corresponding to a particular denominational order, means controlling the displacement of one of said elements in accordance with the value of the steps of said stepped member, said means comprising a plurality of displaceable elements adapted to be projected into abutting contact with the aforesaid steps, and means controlled in accordance with the position of the lower denominational order number bearing element for selectively determining which of said displaceable elements is to be projected.

26. In a device of the class described, a plurality of denominational setting elements for indicating or recording element, means for controlling one of said setting devices from a stepped member, and means controlled from a setting element of lower order for preventing erroneous setting of the setting device controlled from said stepped member when the controlling means is adjacent a transition point from one amount to another.

27. In a machine of the class described, a stop element assuming a plurality of controlling positions, a series of numeral wheels arranged in denominational orders, a unitary controlling element adapted to be displaced in accordance with the position of the said stop, means for setting up in denominational components upon the said wheels, the amount which corresponds to the displacement of the controlling element, said means including devices to prevent improper settings of the wheels when the latter are at transition points between 0 and 9.

28. The invention set forth in claim 27 in which the devices for preventing improper settings of the wheels are controlled from the setting means of the wheels of lower orders.

29. In a device of the class described, in combination with a weighing scale, a single adjustable price setting device adapted to be set to a plurality of positions to correspond to a plurality of prices certain of which comprise a plurality of denominational values, a multiplying device having provisions to multiply the weight upon the scale and the price per unit of weight to which the price setting device has been set, and obtain computed cost products; product and price per unit of weight displaying devices comprising a plurality of elements of varying denominational orders and means for setting up upon the said displaying devices the product in its denominational components and the price in similar components.

30. In a computing scale, a price setting device manually adjustable to a plurality of price positions for controlling the price factor of the multiplication, and means for setting up upon denominational order indicators the price per unit of weight.

31. In a computing scale, a price setting device manually adjustable to a plurality of price positions, a plurality of sets of price indicators adapted to display at the front and back of the machine the price per unit of weight for which the device has been set, said indicators being independent for the different denominational order components of said price, and means cooperating with the price device for controlling the setting of said indicators and means for thereafter setting said indicators.

32. In a computing scale, a plurality of numeral wheel setting devices, arranged in a plurality of groups and having an independent device for each denominational order, a price setting device manually adjustable to different price controlling positions and adapted to control one group of said devices, a multiplying means adapted to control another group of said devices, and manually operable means for positioning said devices in accordance with the aforesaid price device controlling means.

33. In a weighing scale, in combination a plurality of price displaying numeral wheels, a plurality of product displaying numeral wheels, means for setting up prices and products upon said wheels, and devices whereby movement of the price setting means will directly actuate higher order product setting means to display a product of price multiplied by weight.

34. In a machine of the class described, in combination, a plurality of price wheels arranged in denominational orders, a plurality of product wheels arranged in denominational orders, and means for setting up prices and products upon said wheels, and means for transferring an amount derived from the price wheels to product wheels of a different denominational order for the purpose described.

35. In a machine of the class described, in combination, a plurality of price wheels arranged in denominational order, a plurality of product wheels arranged in denominational order, means for setting up prices upon said price wheels, means for setting up said price amount upon the product wheels of a different denominational order, and means for setting up another product amount upon said product wheels and for transferring from lower to higher order wheels when the accumulated amount upon any wheel exceeds the capacity of said wheel.

36. In combination with a computing device having provisions for multiplying one factor by another, means for displaying the result of the multiplication, including a plurality of number bearing elements of different denominational orders, and means for controlling the transition point between the numbers upon a higher order number bearing element by the numbers of lower denomination.

37. In a machine of the class described, in combination, a plurality of setting devices for numeral bearing elements of different denominational orders, controlling devices for said setting means adapted to assume a multiplicity of positions, and means controlled from a lower order setting device and number bearing element for preventing the improper adjustment of a higher order setting device when the latter is adjacent a transition point.

38. In a machine of the class described, in combination, a plurality of number bearing setting elements arranged in denominational orders, control means therefor, means for preventing the improper positioning of one of said elements at transition points, said means being controlled in accordance with the position of the number bearing setting element of next lower order.

39. A setting device for number bearing elements arranged in a denominational order, comprising in combination, with the controlling means for an element of a higher order, of means controlled by an element of lower order to prevent improper settings of the higher order number bearing element when the latter is at transition points substantially as described.

40. In a computing device adapted to perform computations by translating the various factors thereof into geometrical magnitudes: means for representing one factor by the sine of an adjustable angle; and means for translating the result from a geometrical magnitude into figures comprising a mechanical vernier for accurately determining the units figure, and means controlled thereby for determining the figures of higher denominations.

41. In a computing scale: a movable stop positioned by the scale; a movable carriage controlled thereby for performing the computation; means for varying the direction of motion of said carriage; and means for preventing the computing operation until the scale is in its position of equilibrium.

42. An automatic scale; computing mechanism, controlled thereby, for multiplying the weight on the scale by another factor; means for preventing operation of the computing mechanism until the weight factor is accurately determined; and means for preventing operation of the computing mechanism while the other factor is indeterminate.

43. In a computing scale: a multiplying device; a price setting means therefor; means for preventing actuation of said multiplying device until the price setting device is approximately located; and means connected with the multiplying device for accurately locating said price setting device.

44. In a multiplying device: a movable stop, representing by its position one factor; a pivoted guide adjustable to an angle representing a second factor; a carriage mounted in said guide and adapted to be arrested by said stop in a position representing the product of the two factors.

45. A movable stop, representing by its position one factor; a carriage having a straight edged member adapted to contact with said stop, thus limiting the movement of the carriage, said straight edged member forming a fixed angle with the direction of movement of said carriage; and means for varying the direction of movement of the carriage to control the value of the other factor.

46. A movable stop, representing by its position one factor; a carriage having a straight edged member adapted to contact with said stop, thus limiting the movement of the carriage, said straight edge forming a fixed angle approximating 90° with the direction of movement of said carriage; and means for varying the direction of movement of the carriage to represent another factor.

47. A movable carriage; a straight edged member attached thereto; rectilineal guides therefor; a pivot about which such guides may be swung; a gear mounted concentric thereto; a rack attached to the carriage and meshing with said gear; a stop, representing by its position one factor, for limiting the motion of the carriage; a cam shaped contour for said stop causing it to be in contact with said straight edged member whenever said stop and gear are both in zero position irrespective of the angular position of the guides.

48. A multiplying device for a computing scale, comprising a guide member shiftable to various price positions, a displaceable scale set stop, a carriage having a bar thereon carried by said guide member and shiftable relatively thereto to bring said bar into cooperation with said stop.

49. In a computing device adapted to perform computations by translating the various factors thereof into geometrical magnitudes: means for representing one factor by the sine of an adjustable angle; and means for translating the result from a geometrical magnitude into figures comprising a mechanical vernier for accurately determining the units figure, means for determining the figures of higher denomination, and means for controlling the transition point between figures of a higher denomination by the figures of lower denominations.

50. In a computing scale, the combination with a plurality of independently rotatable price indicators, of a single price device manually adjustable to a plurality of price positions, and means controlled by said price device for differentially rotating the indicators.

51. In a device of the character described, the combination of a differentially adjustable price per unit of weight indicator for each of a plurality of denominational orders, a single price device manually adjustable to a plurality of price positions, a driving mechanism, and means actuated by the driving mechanism under the control of the price device for differentially adjusting the various indicators of different denominational order.

52. In a machine of the class described, the combination with a scale set stop, of a bar manually adjustable to various price positions and subsequently movable into engagement with the stop to control computations, driving mechanism for effecting said subsequent movements, and devices for preventing operation of the driving mechanism while the aforesaid price setting bar is being set.

53. In a computing scale, the combination with a stop set by the scale at different positions to represent various weights, of a bar manually adjustable to various angular positions with reference to the stop to represent prices, driving mechanism for bringing said bar into contact with the stop to determine the product of weight multiplied by the price, and devices for preventing operation of the driving mechanism while the stop is being set and the bar manually adjusted.

54. In a machine of the class described, the combination of a price setting device, product indicators, a weighing mechanism, computing devices controlled by the price setting device and the weighing mechanism for computing a product or a plurality of partial products depending upon the weight of the load on the weighing mechanism, and means for setting the product indicators to show the complete product obtained at each operation of the computing devices.

55. In a machine of the class described, the combination of a price setting device, product indicators, a weighing mechanism, computing devices controlled by the price setting device and the weighing mechanism for computing a product or a plurality of partial products depending upon the weight of the load on the weighing mechanism, means for setting the product indicators to show the product or the sum of the partial products obtained at an operation of the computing devices, and indicators restoring devices operated at the beginning of each operation of the computing devices.

56. In a machine of the class described, the combination of a plurality of price wheels arranged in denominational orders, a plurality of product wheels arranged in denominational orders, means for simultaneously setting up prices and partial products on said wheels, and means for subsequently operating the product wheels to set up the complete products thereon.

57. In a machine of the class described, the combination of an automatic weighing scale having a primary load offsetting means, a secondary load offsetting device whereby the capacity of said scale may be increased, devices for computing the value of the portion of the load on the scale which is offset by said device, devices for separately computing the value of the remainder of the load on the scale, a set of product indicators, and means for operating the indicators to display as one product the sum of the aforesaid separate computations.

58. In a machine of the class described, the combination of a set of product indicators, an automatic weighing scale, devices for increasing the weighing capacity of the scale mechanism for separately computing products under the control of the scale and products under the control of the capacity increasing means, and devices controlled by said computing mechanism and comprising transfer devices for successively transmitting the separate computations to the product indicators.

59. In an apparatus of the character described, the combination with a set of product indicators, of an automatic weighing scale, price setting devices, a load offsetting device for increasing the weighing capacity of the scale, means controlled jointly by said load offsetting device and the price setting devices for adjusting the indicators to show a product, and means controlled jointly by the automatic scale and the price setting devices for actuating the product indicators to add to the product displayed on said indicators.

60. In a weighing and computing machine, a weighing scale of the automatic type, a load offsetting device for increasing the weighing capacity of the scale, price setting devices, means controlled by the load offsetting device and the price setting devices for computing the value of the portion of the load which is offset, means controlled by the automatic scale and the price setting devices for computing the value of the remainder of the load, indicating devices, and means for operating the indicating devices under the joint control of the computing means to combine in one indication the sum of the two computations.

61. A weighing and computing apparatus having in combination a weighing scale of the automatic type, a price setting mechanism, price indicators, product indicators, means whereby price and product indicators may be simultaneously adjusted differentially under the control of the price setting mechanism when the article on the scale exceeds a certain weight, means controlled by the price setting mechanism and the weighing scale for actuating product indications independently of the price indicators, mechanism for effecting transfers from one product indicator to another, and means for automatically clearing all of the indicators at each operation of the apparatus.

62. In a machine of the class described, the combination with a set of price indicators, of a set of product indicators, normally ineffective devices for connecting price indictors and higher order product indicators whereby the connected indicators may be driven in unison, a capacity weight, devices controlled by said capacity weight for rendering the aforesaid connecting devices effective, manipulative devices, and means controlled by said manipulative devices for differentially actuating the indicators after the aforesaid connection has been effected.

63. In a computing scale mechanism, the combination of a weighing scale, a set of price indicators, a set of product indicators, normally ineffective devices for connecting the price indicators and higher order product indicators manipulative devices whereby said connections may be rendered effective, price setting devices, means controlled by the manipulative devices and the price setting devices for actuating the price indicators and thereby the connected product indicators, and mechanism controlled by price setting devices and the weighing scale and including a transfer mechanism for actuating the product indicators after the adjustments of the price and connected product indicators has been completed.

64. In a computing scale, a price determining device manually adjustable to a plurality of positions to set up various price conditions within the machine, a differentially movable element for each of a plurality of denominational orders, a driving mechanism, means actuated by the driving mechanism for differentially moving said elements under control of the price device, a plurality of differentially adjustable digit carriers, and means for adjusting said carriers according to the adjustment of the differential elements.

In testimony whereof we hereto affix our signatures.

FREDERICK G. L. BOYER.
EDITH E. L. BOYER.